US010083500B2

(12) United States Patent
Naruse et al.

(10) Patent No.: US 10,083,500 B2
(45) Date of Patent: Sep. 25, 2018

(54) RESTORATION FILTER GENERATION DEVICE AND METHOD, IMAGE PROCESSING DEVICE AND METHOD, IMAGING DEVICE, AND NON-TRANSITORY COMPUTER-READABLE MEDIUM

(71) Applicant: FUJIFILM Corporation, Tokyo (JP)

(72) Inventors: Yousuke Naruse, Saitama (JP); Kenkichi Hayashi, Saitama (JP); Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/632,689

(22) Filed: Jun. 26, 2017

(65) Prior Publication Data

US 2017/0294005 A1 Oct. 12, 2017

Related U.S. Application Data

(60) Division of application No. 14/837,779, filed on Aug. 27, 2015, now Pat. No. 9,727,955, which is a (Continued)

(30) Foreign Application Priority Data

Mar. 4, 2013 (JP) ................................ 2013-042185

(51) Int. Cl.
*G06T 5/00* (2006.01)
*G06T 5/20* (2006.01)
(Continued)

(52) U.S. Cl.
CPC ................ *G06T 5/20* (2013.01); *G06T 5/003* (2013.01); *H04N 5/357* (2013.01); *H04N 9/646* (2013.01);
(Continued)

(58) Field of Classification Search
None
See application file for complete search history.

(56) References Cited

U.S. PATENT DOCUMENTS 6,088,059 A 7/2000 Mihara et al.
2004/0218235 A1 11/2004 Kawano
(Continued)

FOREIGN PATENT DOCUMENTS

JP 9-238357 A 9/1997
JP 2008-147980 A 6/2008
(Continued)

OTHER PUBLICATIONS

International Search Report issued in PCT/JP2013/080647, dated Dec. 24, 2013.

(Continued)

*Primary Examiner* — Bernard Krasnic
(74) *Attorney, Agent, or Firm* — Birch, Stewart, Kolasch & Birch, LLP

(57) ABSTRACT

A restoration filter generation device which generates a restoration filter for performing a restoration process on luminance system image data, the restoration process being based on a point-image distribution in an optical system, the luminance system image data being image data relevant to luminance and being generated based on image data for each color of multiple colors, the restoration filter generation device including an MTF acquisition device which acquires a modulation transfer function MTF for the optical system; and a restoration filter generation device which generates the restoration filter based on the modulation transfer function MTF, the restoration filter suppressing an MTF value of image data for each color of the multiple colors to 1.0 or less at least in a region of a particular spatial frequency or less, the image data for each color of the multiple colors corre- (Continued)

sponding to the luminance system image data after the restoration process.

8 Claims, 25 Drawing Sheets

Related U.S. Application Data continuation of application No. PCT/JP2013/080647, filed on Nov. 13, 2013.

(51) Int. Cl.
*H04N 5/357* (2011.01)
*H04N 9/64* (2006.01)

(52) U.S. Cl.
CPC .............. *G06T 2207/10024* (2013.01); *G06T 2207/20024* (2013.01)

(56) References Cited

U.S. PATENT DOCUMENTS

2008/0137947 A1 6/2008 Sawada et al.
2010/0079630 A1 4/2010 Mishima et al.
2011/0199514 A1 8/2011 Tamura
2012/0050583 A1* 3/2012 Watanabe .............. G06T 5/003 348/241
2012/0069237 A1 3/2012 Kishine
2012/0154626 A1 6/2012 Hatakeyama et al.
2013/0050539 A1* 2/2013 Watanabe .............. G06T 5/003 348/241

FOREIGN PATENT DOCUMENTS

JP 2010-87614 A 4/2010
JP 2010-140442 A 6/2010
JP 2010-219683 A 9/2010
JP 2012-65187 A 3/2012
JP 2012-129932 A 7/2012
WO 2010/071001 A1 6/2010

OTHER PUBLICATIONS

Written Opinion issued in PCT/JP2013/080647, dated Dec. 24, 2013.
Notice of Allowance dated Mar. 28, 2017 in U.S. Appl. No. 14/837,779.
Office Action dated Jan. 20, 2017 in U.S. Appl. No. 14/837,779.

* cited by examiner (A)
MTF VALUE
LENS MTF
1.0
47G
47R
47B
SPATIAL FREQUENCY
(B)
MTF VALUE
MAXIMUM LENS MTF
1.0
47R
47B
47G
SPATIAL FREQUENCY
(C)
AMPLIFICATION FACTOR
RESTORATION FILTER CORRESPONDING TO MAXIMUM LENS MTF (WIENER FILTER)
1.0
SPATIAL FREQUENCY
(D)
12
RESTORATION FILTER (A)
MTF VALUE
LENS MTF
1.0
47G
47R
47B
SPATIAL FREQUENCY
(B)
MTF VALUE
AVERAGE LENS MTF
1.0
47G
47R
47B
SPATIAL FREQUENCY
(C)
AMPLIFICATION FACTOR
RESTORATION FILTER
1.0
SPATIAL FREQUENCY
(D)
MTF VALUE
RESTORATION RGB IMAGE MTF
1.0
B
G
R
SPATIAL FREQUENCY (A)
MTF VALUE
LENS MTF
1.0
47G
47R
47B
SPATIAL FREQUENCY
(B)
AMPLIFICATION FACTOR
RESTORATION FILTERS FOR RESPECTIVE COLORS
64B
64G
64R
1.0
SPATIAL FREQUENCY
(C)
AMPLIFICATION FACTOR
RESTORATION FILTER
62
1.0
SPATIAL FREQUENCY AMPLIFICATION FACTOR
1.0
RESTORATION FILTER
62
ATTENUATION FOR R, G
SPATIAL FREQUENCY
AMPLIFICATION FACTOR
1.0
RESTORATION FILTER
12
NOISE AMPLIFICATION FOR B
SPATIAL FREQUENCY
RESTORATION FILTER
66

RESTORATION FILTER GENERATION DEVICE AND METHOD, IMAGE PROCESSING DEVICE AND METHOD, IMAGING DEVICE, AND NON-TRANSITORY COMPUTER-READABLE MEDIUM

CROSS-REFERENCE TO RELATED APPLICATIONS

This application is a Division of co-pending U.S. application Ser. No. 14/837,779 filed Aug. 27, 2015, which is a Continuation of PCT International Application No. PCT/JP2013/080647 filed on Nov. 13, 2013, which claims priority under 35 U.S.C § 119(a) to Japanese Patent Application No. 2013-042185 filed on Mar. 4, 2013. Each of the above application(s) is hereby expressly incorporated by reference, in its entirety, into the present application.

BACKGROUND OF THE INVENTION

Field of the Invention

The present invention relates to a restoration filter generation device and method for generating a restoration filter to be used in a restoration process, an image processing device and method for performing the restoration process using the restoration filter, an imaging device including the image processing device, and a non-transitory computer-readable medium for generating the restoration filter.

Description of the Related Art

In an image obtained by the imaging of a subject with an imaging device such as a digital camera, an image degradation deriving from various aberrations in an optical system (an image-taking lens and the like) sometimes appears. The image degradation by the aberrations can be expressed by a point-image distribution function (PSF: Point Spread Function) and the like. Therefore, by generating a restoration filter based on the degradation characteristic of the optical system such as the PSF and performing a point-image restoration process (restoration process) on the image data using the restoration filter, it is possible to reduce the image degradation.

Such a point-image restoration process is classified roughly into a frequency restoration process and a phase restoration process. The frequency restoration process equates the modulation transfer function (MTF) characteristic of the image degraded by the optical system. In the phase restoration process, a picture is moved depending on the frequency such that the asymmetric PSF form is restored to a point as much as possible.

On this occasion, the aberration in the optical system such as the image-taking lens differs depending on the wavelength, and therefore, it is desirable to perform the point-image restoration process using restoration filters that are different among the images for the respective colors of RGB. However, the process for each color results in a heavy computation load, and therefore, it has been considered to perform the point-image restoration process only on the luminance component, which has a great visual effect. In this case, since the PSF form for the luminance cannot be defined, it is necessary to consider some sort of criterion and find a middle ground so as not to generate an adverse effect on the restoration performance.

An image processing device described in Japanese Patent Application Laid-Open No. 2010-140442 (hereinafter referred to as PTL 1) calculates PSFs for the respective colors of RGB, synthesizes the PSFs for the respective colors with previously defined weighting coefficients for the respective colors to calculates a PSF for a luminance system image (also referred to as a luminance component image), and generates a restoration filter for the luminance system image based on the PSF. Then, the image processing device performs a point-image restoration process on the luminance system image, using the restoration filter, and thereafter, generates an RGB image based on the luminance system image after the restoration process and a color-difference system image (also referred to as a color component image) that is not a target of the point-image restoration process. Thereby, it is possible to reduce the image degradation such as false colors.

SUMMARY OF THE INVENTION

The image processing device in PTL 1 can averagely equate the RGB image (make the MTF values uniform with 1.0; equalize). However, the image processing device in PTL 1 performs the point-image restoration process only on the luminance system image, and therefore, there is a fear that an overcorrection occurs for a particular wavelength (color). The overcorrection herein means that at least any MTF value of the RGB image corresponding to the luminance system image after the point-image restoration process becomes greater than 1.0 (see the (D) portion of FIG. 10).

An object of the present invention is to provide a restoration filter generation device and method for generating a restoration filter that can prevent the overcorrection of the MTF value of the image for each color when the restoration process is performed on the luminance system image, an image processing device and method for performing the restoration process using the restoration filter, an imaging device including the image processing device, and a non-transitory computer-readable medium for generating the restoration filter.

A restoration filter generation device which attains the object of the present invention is a restoration filter generation device to generate a restoration filter for performing a restoration process on luminance system image data, the restoration process being based on a point-image distribution in an optical system, the luminance system image data being image data relevant to luminance and being generated based on image data for each color of multiple colors, the image data for each color of the multiple colors being obtained by an imaging device including the optical system, the restoration filter generation device including: an MTF acquisition device which acquires a modulation transfer function MTF for the optical system; and a restoration filter generation device which generates the restoration filter based on the modulation transfer function MTF acquired by the MTF acquisition device, the restoration filter suppressing an MTF value of image data for each color of the multiple colors to 1.0 or less at least in a region of a particular spatial frequency or less, the image data for each color of the multiple colors corresponding to the luminance system image data after the restoration process.

According to the present invention, the MTF value of the image data for each color of the multiple colors corresponding to the luminance system image data after the restoration process is suppressed to 1.0 or less, at least in the region of the particular spatial frequency or less.

It is preferable that the MTF acquisition device acquire the modulation transfer function MTF for each color of the multiple colors, and the restoration filter generation device select a maximum value of the MTF value from the modulation transfer functions MTF for the respective colors, for each spatial frequency, determine a frequency characteristic of a Wiener filter, based on the maximum value of the MTF value for each spatial frequency, and generate the restoration filter that achieves the frequency characteristic in a luminance system. Thereby, a certain degree of effect of suppressing the MTF value of the image data for each color of the multiple colors corresponding to the luminance system image data after the point-image restoration process to 1.0 or less is expected.

It is preferable that the restoration filter generation device include an amplification factor acquisition device which acquires an amplification factor of the MTF value for each spatial frequency with respect to image data for each color of the multiple colors, the amplification factor corresponding to an amplification factor of the MTF value for each spatial frequency with respect to the luminance system image data after the restoration process, the image data for each color of the multiple colors being generated by an inverse conversion process of the luminance system image data, the MTF acquisition device acquire the modulation transfer function MTF for each color of the multiple colors, and the restoration filter generation device determine frequency characteristics of restoration filters for the respective colors, based on the modulation transfer functions MTF for the respective colors respectively, select a minimum value of the amplification factors of the restoration filters for the respective colors, for each spatial frequency, based on the frequency characteristics, and generate the restoration filter based on the minimum value of the amplification factor for each spatial frequency and the acquisition result by the amplification factor acquisition device. The restoration process can be performed using a restoration filter designed on the basis of a color having a low MTF value for each spatial frequency, and therefore, it is possible to suppress the MTF value of the image data for each color of the multiple colors corresponding to the luminance system image data after the restoration process to 1.0 or less. Further, it is possible to prevent the amplification of the noise for another color due to the frequency characteristic of a restoration filter designed on the basis of a color having a high MTF in the particular spatial frequency.

It is preferable that the image data for the multiple colors contain image data for each color of RGB, the restoration filter generation device include an amplification factor acquisition device which acquires an amplification factor of the MTF value for each spatial frequency with respect to image data for each color of the multiple colors, the amplification factor corresponding to an amplification factor of the MTF value for each spatial frequency with respect to the luminance system image data after the restoration process, the image data for each color of the multiple colors being generated by an inverse conversion process of the luminance system image data, the MTF acquisition device acquire the modulation transfer function MTF for each color of the multiple colors, and the restoration filter generation device calculate a filter coefficient of a Wiener filter based on the modulation transfer function MTF for each color of RGB and the acquisition result by the amplification factor acquisition device, and generate the restoration filter based on the filter coefficient, the Wiener filter meeting a condition that the MTF value of the image data for each color after the restoration process is 1.0 or less. Thereby, it is possible to suppress the MTF value of the image data for each color of the multiple colors corresponding to the luminance system image data after the restoration process to 1.0 or less. Further, it is possible to averagely perform the best frequency restoration while tolerating the noise emphasis for a particular color in some degree, and to ensure that an excessive emphasis of the MTF value does not occur for any color.

It is preferable that the image data for the multiple colors contain image data for each color of RGB, the MTF acquisition device acquire the modulation transfer function MTF for the G color, and the restoration filter generation device determine a frequency characteristic of a Wiener filter based on the modulation transfer function MTF for the G color acquired by the MTF acquisition device, and generate the restoration filter that achieves the frequency characteristic in a luminance system. A certain degree of effect of suppressing the MTF value of the image data for each color of the multiple colors corresponding to the luminance system image data after the restoration process to 1.0 or less at least in the region of the particular spatial frequency or less is expected. Further, it is possible to simplify the computation process required for the generation of the restoration filter. Moreover, it is possible to perform the generation of the restoration filter, without acquiring the modulation transfer functions MTF for all colors with respect to the optical system.

It is preferable that the particular spatial frequency be equal to or less than a half of a Nyquist frequency of an imaging element included in the imaging device. In this case, in the optical system, the modulation transfer function MTF for the G color is higher than the modulation transfer functions MTF for the other colors, in the frequency region that is equal to or less than the half of the Nyquist frequency of the imaging element.

It is preferable that the MTF acquisition device acquire the modulation transfer function MTF for the optical system including a lens unit that modulates a phase and extends a depth of field. This allows for a suitable image restoration in the range of an extended depth of field (focal depth), even for the restoration process in an EDoF system.

Further, an image processing device according to an aspect of the present invention includes: an image data generation device which generates luminance system image data based on image data for each color of multiple colors, the luminance system image data being image data relevant to luminance, the image data for each color of the multiple colors being obtained by an imaging device including an optical system; a restoration filter storage device which stores the restoration filter generated by the restoration filter generation device according to the above each aspect; and a restoration processing device which performs a restoration process on the luminance system image data generated by the image data generation device, using the restoration filter stored in the restoration filter storage device.

Further, an imaging device according to the present invention includes: an imaging device which outputs image data for each color of multiple colors, the imaging device including an optical system; and the image processing device according to the above aspect.

Further, a restoration filter generation method according to the present invention is a restoration filter generation method for generating a restoration filter for performing a restoration process on luminance system image data, the restoration process being based on a point-image distribution in an optical system, the luminance system image data being image data relevant to luminance and being generated based on image data for each color of multiple colors, the image data for each color of the multiple colors being obtained by an imaging device including the optical system, the restoration filter generation method including: an MTF acquisition step of acquiring a modulation transfer function MTF for the optical system; and a restoration filter generation step of generating the restoration filter based on the modulation transfer function MTF acquired in the MTF acquisition step, the restoration filter suppressing an MTF value of image data for each color of the multiple colors to 1.0 or less at least in a region of a particular spatial frequency or less, the image data for each color of the multiple colors corresponding to the luminance system image data after the restoration process.

Further, an image processing method according to an aspect of the present invention includes: an image data generation step of generating luminance system image data based on image data for each color of multiple colors, the luminance system image data being image data relevant to luminance, the image data for each color of the multiple colors being obtained by an imaging device including an optical system; and a restoration processing step of performing a restoration process on the luminance system image data generated in the image data generation step, using the restoration filter generated by the restoration filter generation method according to the above aspect.

Further, a non-transitory computer-readable medium according to the present invention is a non-transitory computer-readable medium recording a program for generating a restoration filter for performing a restoration process on luminance system image data, the restoration process being based on a point-image distribution in an optical system, the luminance system image data being image data relevant to luminance and being generated based on image data for each color of multiple colors, the image data for each color of the multiple colors being obtained by an imaging device including the optical system, the program causing a computer to execute: an MTF acquisition step of acquiring a modulation transfer function MTF for the optical system; and a restoration filter generation step of generating the restoration filter based on the modulation transfer function MTF acquired in the MTF acquisition step, the restoration filter suppressing an MTF value of image data for each color of the multiple colors to 1.0 or less at least in a region of a particular spatial frequency or less, the image data for each color of the multiple colors corresponding to the luminance system image data after the restoration process.

The restoration filter generation device and method, the image processing device and method, the imaging device, and the transitory computer-readable medium according to the present invention perform the generation of the restoration filter that suppresses the MTF value of the image data for each color of the multiple colors corresponding to the luminance system image data after the restoration process to 1.0 or less at least in the region of the particular spatial frequency or less, or the restoration process using the restoration filter, and therefore, it is possible to prevent the overcorrection of the MTF value of the image for each color, even in the case of performing the restoration process on the luminance system image data.

DETAILED DESCRIPTION OF THE PREFERRED EMBODIMENTS

First Embodiment

<Configuration of Digital Camera>

Figure 1:
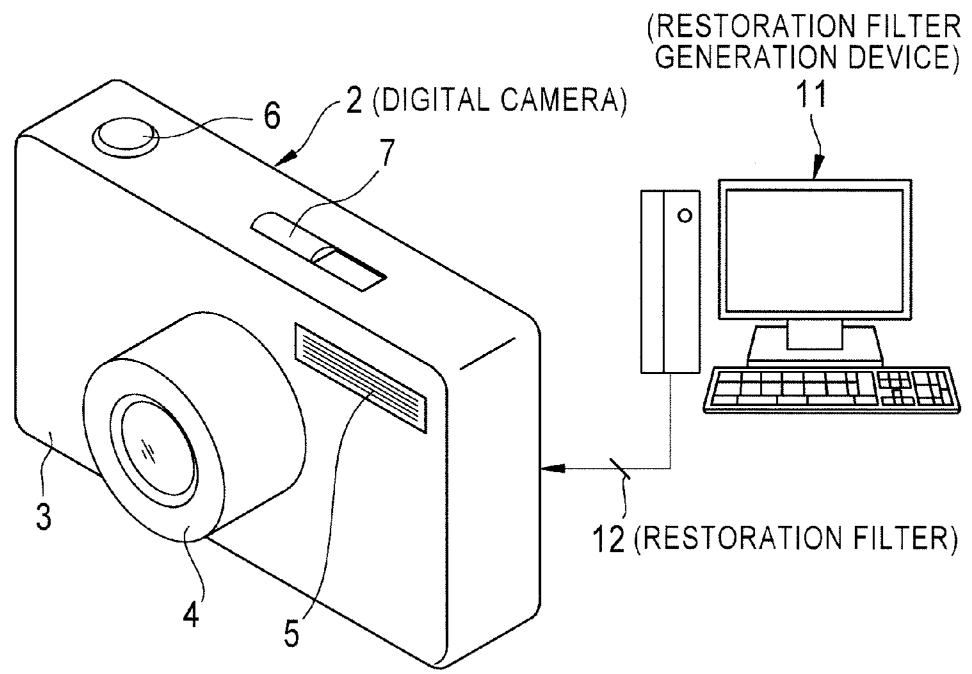
FIG. 1 is a diagram of a restoration filter generation device and a digital camera that acquires a restoration filter from the restoration filter generation device and performs a point-image restoration process.
Figure 2:
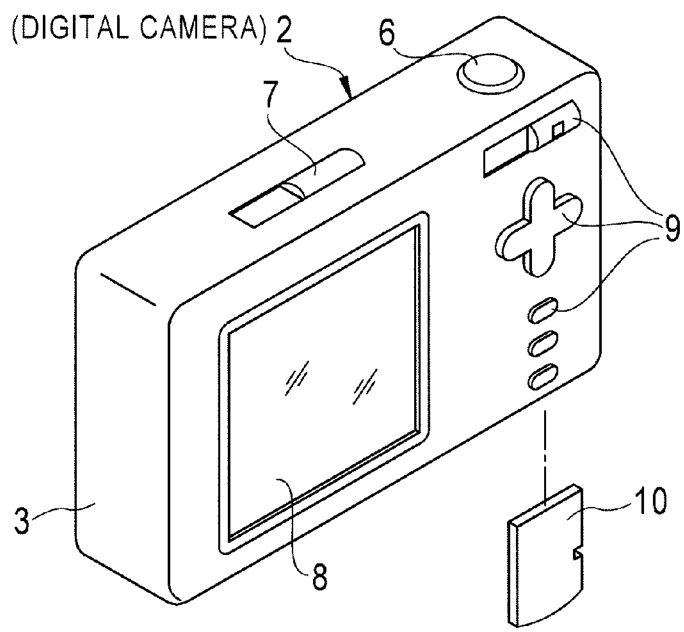
FIG. 2 is a back perspective view of the digital camera.

In FIG. 1 and FIG. 2, a digital camera 2 corresponds to an imaging device according to the present invention. On the front surface of a camera body 3 of the digital camera 2, a lens barrel 4 including an optical system and the like, a strobe light emission unit 5 and the like are provided. On the top surface of the camera body 3, a shutter button 6, a power switch 7 and the like are provided.

On the back surface of the camera body 3, a display unit 8, an operation unit 9 and the like are provided. In an image-taking standby state, the display unit 8 functions as an electronic viewfinder, and displays a live view image (also referred to as a through image). Further, during image review, an image is reproduced and displayed on the display unit 8, based on the image data recorded in a memory card 10.

The operation unit 9 is composed of a mode switch, a cross key, an execution key and the like. The mode switch is operated for changing the operation mode of the digital camera 2. The digital camera 2 has an image-taking mode for imaging a subject and obtaining taken image data, a review mode for review and display based on the taken image data, and the like.

The cross key and the execution key are operated for the display of various menu screens and setting screens on the display unit 8, the movement of a cursor displayed in these menu screens and setting screens, the determination of a variety of setting of the digital camera 2, and the like.

On the bottom surface of the camera body 3, although not shown, a card slot into which a memory card 10 is loaded, and a mount cover that opens and closes the opening of the card slot are provided. In the memory card 10, the taken image data obtained by the imaging of a subject is recorded as an image file in various file formats.

The digital camera 2 having the above configuration performs a point-image restoration process using a restoration filter 12 acquired from a restoration filter generation device 11, for reducing the image degradation deriving from various aberrations in an optical system. Here, the acquisition of the restoration filter 12 by the digital camera 2 is handled by a camera manufacturer.

Figure 3:
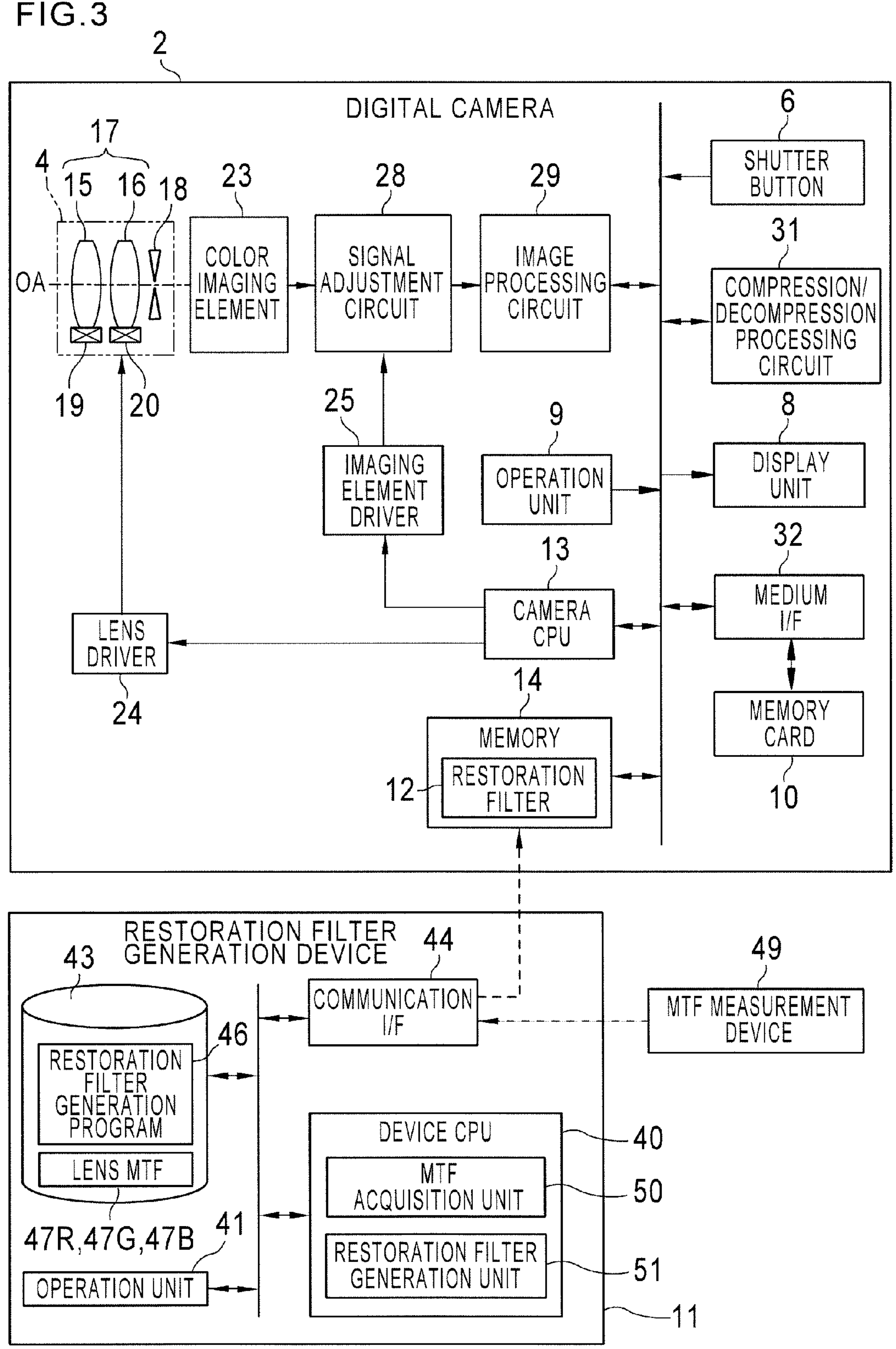
FIG. 3 is a block diagram showing the electric configuration of the digital camera and the restoration filter generation device.

As shown in FIG. 3, a camera CPU (Central Processing Unit) 13 of the digital camera 2 sequentially executes a variety of programs and data read from a memory 14, based on a control signal from the operation unit 9, and integrally controls each unit of the digital camera 2.

In a ROM (Read Only Memory) region of the memory 14, which corresponds to a restoration filter storage device according to the present invention, the restoration filter 12 acquired from the restoration filter generation device 11 is stored in addition to the above-described variety of programs. Further, a RAM (Random Access Memory) region of the memory 14 functions as a work memory for the process execution by the camera CPU 13 and as a temporary storage location of a variety of data.

In the lens barrel 4, an optical system 17 composed of a zoom lens 15, a focus lens 16 and the like is embedded. The zoom lens 15 and the focus lens 16 are driven by a zoom mechanism 19 and a focus mechanism 20, respectively, and are moved back and forth along an optical axis OA of the optical system 17.

A mechanical shutter 18 includes a movable part (not shown) that moves between a closed position for blocking subject light incidence to a color imaging element 23 and an open position for allowing the subject light incidence. The mechanical shutter 18 moves the movable part to the respective positions, and thereby, opens and shuts an optical path from the optical system 17 to the color imaging element 23. Further, the mechanical shutter 18 includes a diaphragm for controlling the light quantity of the subject light that enters the color imaging element 23. The mechanical shutter 18, the zoom mechanism 19 and the focus mechanism 20 are operated and controlled by the camera CPU 13 through a lens driver 24.

In the back of the optical system 17, the color imaging element 23 that is a single-plate type is arranged. On the imaging surface of the color imaging element 23, multiple pixels arranged in a matrix are formed in a predetermined pattern array (the Bayer array, the G stripe R/B full checker pattern, the X-Trans Array®, the honeycomb array, or the like). Each pixel includes a micro-lens, a color filter (in the example, an R (red), G (green) or B (blue) color filter), and a photodiode. The color imaging element 23, which constitutes an imaging device according to the present invention together with the optical system 17, converts a subject image formed on the imaging surface by the optical system 17, into an electric output signal, and outputs it. Here, as the color imaging element 23, each kind of imaging element of a CCD (Charge Coupled Device) color imaging element, a CMOS (Complementary Metal Oxide Semiconductor) color imaging element and the like is used. An imaging element driver 25 controls the drive of the color imaging element 23, under the control by the camera CPU 13.

A signal adjustment circuit 28 performs various signal adjustment processes on the output signal output from the color imaging element 23, and generates mosaic image data R1, G1, B1 (see FIG. 4) of RGB associated with the color filter array of the color imaging element 23. Here, the signal adjustment circuit 28 is composed of, for example, a CDS/AGC (Correlated Double Sampling/Automatic Gain Control) circuit, an A/D conversion circuit and the like in the case where the color imaging element 23 is a CCD type, and is composed of, for example, an amplifier and the like in the case of a CMOS type.

<Configuration of Image Processing Circuit>

An image processing circuit 29 corresponds to an image processing device according to the present invention. The image processing circuit 29 performs a black level adjustment process, a white balance correction process, a gamma correction process, a demosaic process, a YC conversion process, a point-image restoration process and the like, to the mosaic image data R1, G1, B1 input from the signal adjustment circuit 28, and generates luminance system image data Y and color-difference system image data Cb, Cr (see FIG. 4). The luminance system image data Y and the color-difference system image data Cb, Cr are temporarily stored in a VRAM (Video Random Access Memory) region of the memory 14 (the VRAM may be provided separately).

The VRAM region has a memory area for the live view image in which images equivalent to two continuous fields are stored. The luminance system image data Y and color-difference system image data Cb, Cr stored in the VRAM region are sequentially output to the display unit 8. Thereby, the live view image is displayed on the display unit 8.

When the shutter button 6 is pushed down in the image-taking mode, a compression/decompression processing circuit 31 performs a compression process on the luminance system image data Y and color-difference system image data Cb, Cr stored in the VRAM region. Further, the compression/decompression processing circuit 31 performs a decompression process on the compressed image data obtained from the memory card 10 through a medium I/F 32. The medium I/F 32 performs the recording and reading of the compressed image data to and from the memory card 10 and the like.

Figure 4:
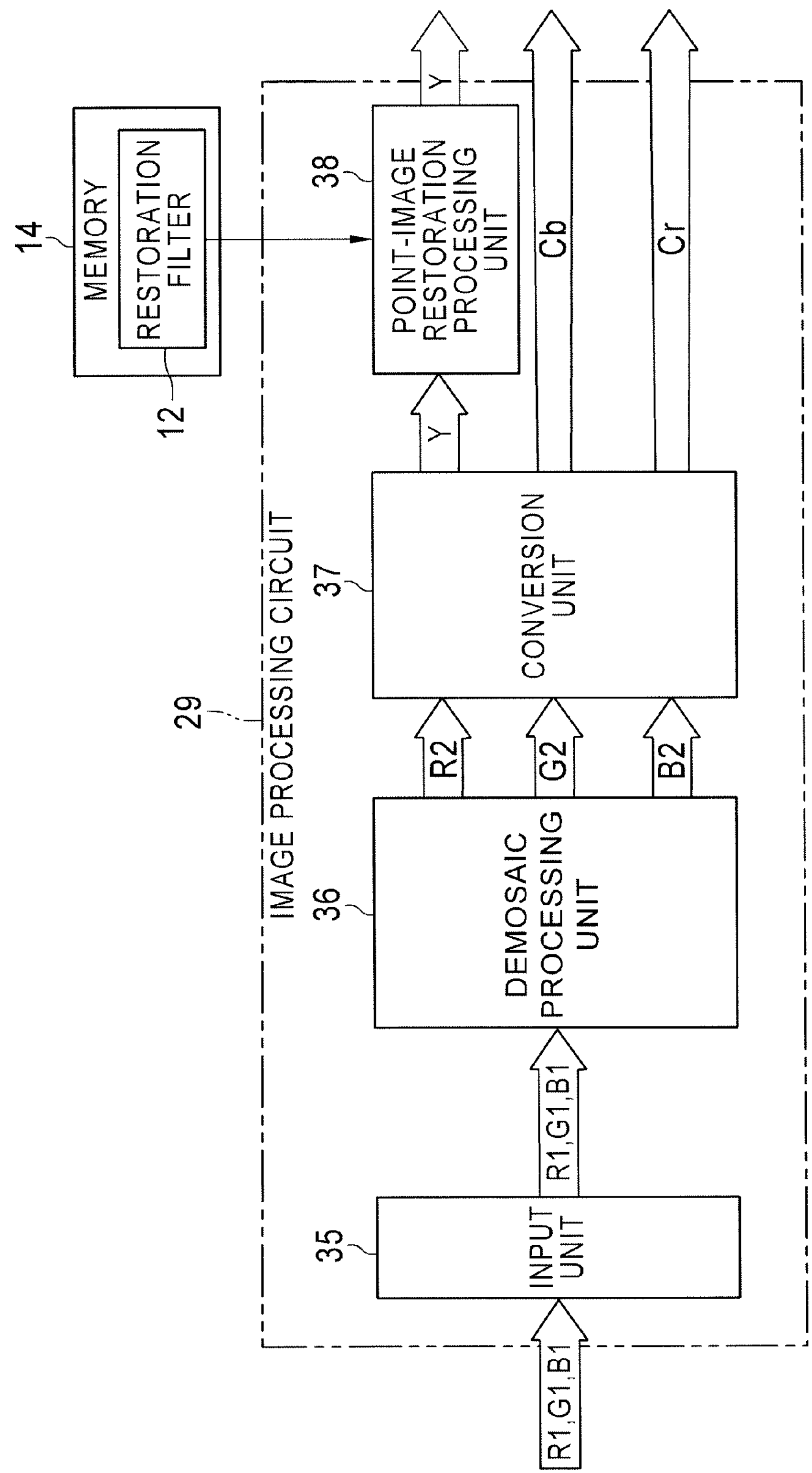
FIG. 4 is a functional block diagram of an image processing circuit of the digital camera.

As show in FIG. 4, the image processing circuit 29 includes mainly an input unit 35, a demosaic processing unit 36, a conversion unit (image data generation device) 37 and a point-image restoration processing unit (restoration processing device) 38. Here, although the image processing circuit 29 includes also correction processing units to perform the white balance correction process, the gamma correction process and the like, the illustration and explanation of these correction processing units are omitted for preventing the complication of the explanation.

The input unit 35 outputs, to the demosaic processing unit 36, the mosaic image data R1, G1, B1 for the respective colors of RGB input from the signal adjustment circuit 28. That is, the input unit 35 functions as an input I/F to which the image data for the respective colors obtained by the imaging with the color imaging element 23 is input.

The demosaic processing unit 36 performs a demosaic process (also referred to as a synchronization process) for calculating the color information for all of RGB on a pixel basis (for converting it into a synchronous system), based on the mosaic image data R1, G1, B1 for the respective colors, and generates RGB image data R2, G2, B2 composed of the color data of the three planes of RGB. The demosaic processing unit 36 outputs the RGB image data R2, G2, B2 to the conversion unit 37.

The conversion unit 37 performs the YC conversion process on the RGB image data R2, G2, B2, and generates the luminance system image data Y and the color-difference system image data Cb, Cr. The luminance system image data Y, for example, is generated in accordance with Formula [Y=0.3R+0.6G+0.1B]. In this formula, the contribution ratio of the G color is 60%, and therefore, the G color is higher in contribution ratio than the R color (a contribution ratio of 30%) and the B color (a contribution ratio of 10%). Therefore, the G color is the color of the three primary colors that most contributes to the luminance signal.

Here, in the embodiment, the luminance system image data Y is explained taking as an example the value of the luminance signal in a color space to be expressed by "Y, Cb, Cr", but is not particularly limited if it is the data contributing to the luminance of an image, and means a variety of data having the information relevant to the luminance of a captured image. The examples include the data indicating the brightness L in a CIELAB (Commission internationale de l'eclairage) color space, the highest data in the contribution ratio for obtaining the luminance signal, the data corresponding to the color filter with the color that most contributes to the luminance, and the like.

The point-image restoration processing unit 38 reads the restoration filter 12 stored in the memory 14, and performs a point-image restoration process (a restoration process according to the present invention) on the luminance system image data Y using the restoration filter 12. For decreasing the load of the computation process, the point-image restoration process is performed only on the luminance system image data Y, which has a great visual effect. By performing the point-image restoration process, the blur of the image is corrected as shown in FIG. 5.

Figure 5:
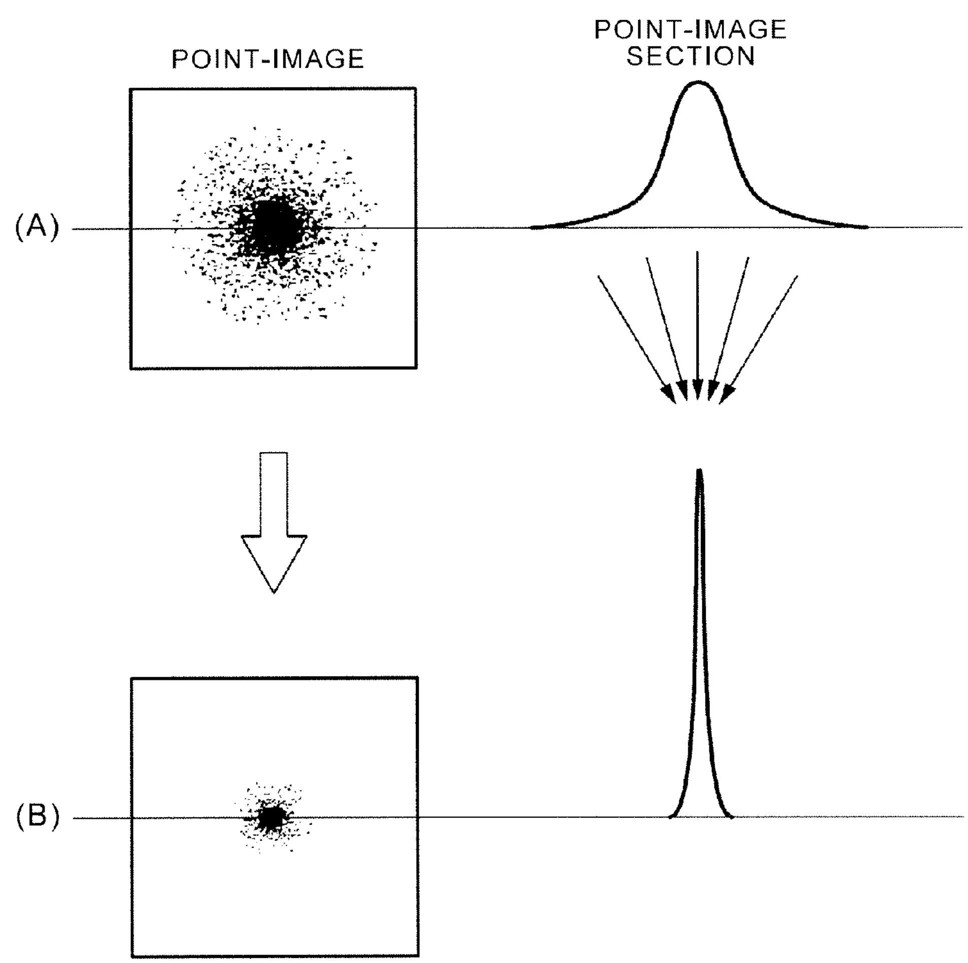
FIG. 5 is an explanatory diagram for explaining the point-image restoration process.

As shown in the (A) portion of FIG. 5, a point-image (optical image) transmitted by the optical system 17 is formed on the imaging surface of the color imaging element 23, as a large point-image (a blurred image), but by the point-image restoration process, is restored to a small point-image (an image giving a high resolution feeling) as shown in the (B) portion of FIG. 5.

Here, as described above, the point-image restoration process is classified roughly into the frequency restoration process and the phase restoration process. Since an object of the present application is to prevent the overcorrection of the MTF value of the image for each color of RGB when the point-image restoration process is performed on the luminance system image data Y, only the frequency restoration process is explained as the point-image restoration process, and the explanation of the phase restoration process is omitted.

<Configuration of Restoration Filter Generation Device>

Returning to FIG. 3, the restoration filter generation device 11 generates the restoration filter 12 to be used in the point-image restoration process of the digital camera 2. The restoration filter generation device 11 includes a device CPU 40, an operation unit 41, a storage 43 and a communication I/F 44.

The device CPU 40 appropriately reads various programs from the storage 43 to execute it, based on an operation instruction input to the operation unit 41, and thereby, integrally controls the whole of the device. Further, the operation unit 41 is a keyboard or a mouse, for example.

In the storage 43, a restoration filter generation program 46 corresponding to a program according to the present invention, lens MTFs 47R, 47G, 47B corresponding to the modulation transfer functions MTF for the respective colors of RGB in the optical system 17, and the like are stored.

The communication I/F 44 is connected with an MTF measurement device 49 that measures the lens MTFs of the optical system 17. Here, the measurement method for the lens MTFs 47R, 47G, 47B by the MTF measurement device 49 is a known technology, and therefore, the specific explanation is omitted. The communication I/F 44, under the control by the device CPU 40, acquires the lens MTFs 47R, 47G, 47B corresponding to the optical system 17, from the MTF measurement device 49, and stores them in the storage 43.

Further, the communication I/F 44 can be connected with a communication I/F (not shown) of the digital camera 2 through various communication cables and communication lines (including wireless), and sends, to the digital camera 2, the restoration filter 12 generated by the device CPU 40. Thereby, the restoration filter 12 is stored in the memory 14 of the digital camera 2.

<Generation Process of Restoration Filter>

When a restoration filter generation operation is performed in the operation unit 41, the device CPU 40 reads a restoration filter generation program 46 from the storage 43 to execute it, and thereby, functions as an MTF acquisition unit 50 and a restoration filter generation unit (restoration filter generation device) 51.

The MTF acquisition unit 50 functions as an MTF acquisition device according to the present invention, together with the above-described communication I/F 44, and outputs, to the restoration filter generation unit 51, the lens MTFs 47R, 47G, 47B for the respective colors of RGB stored in the storage 43.

Based on the lens MTFs 47R, 47G, 47B, the restoration filter generation unit 51 generates the restoration filter 12 that can suppress the overcorrection of the MTF value of the RGB image data (hereinafter, referred to as merely the "restoration RGB image data") corresponding to the luminance system image data Y after the point-image restoration process. Here, the restoration RGB image data corresponds to the RGB image data that is inversely converted from the luminance system image data Y after the point-image restoration process and the color-difference system image data Cb, Cr that are not targets of the point-image restoration process. Further, the suppression of the overcorrection of the MTF value of the restoration RGB image data device that the MTF value of the restoration RGB image data is suppressed to 1.0 or less. In the following, the generation of the restoration filter 12 by the restoration filter generation unit 51 is specifically explained using FIG. 6. Here, the lens MTF and the restoration filter are expressed as a two-dimensional function with respect to the spatial frequency, but in the specification, are expressed as a one-dimensional function with respect to the spatial frequency, for preventing the complication of the drawings.

Figure 6:
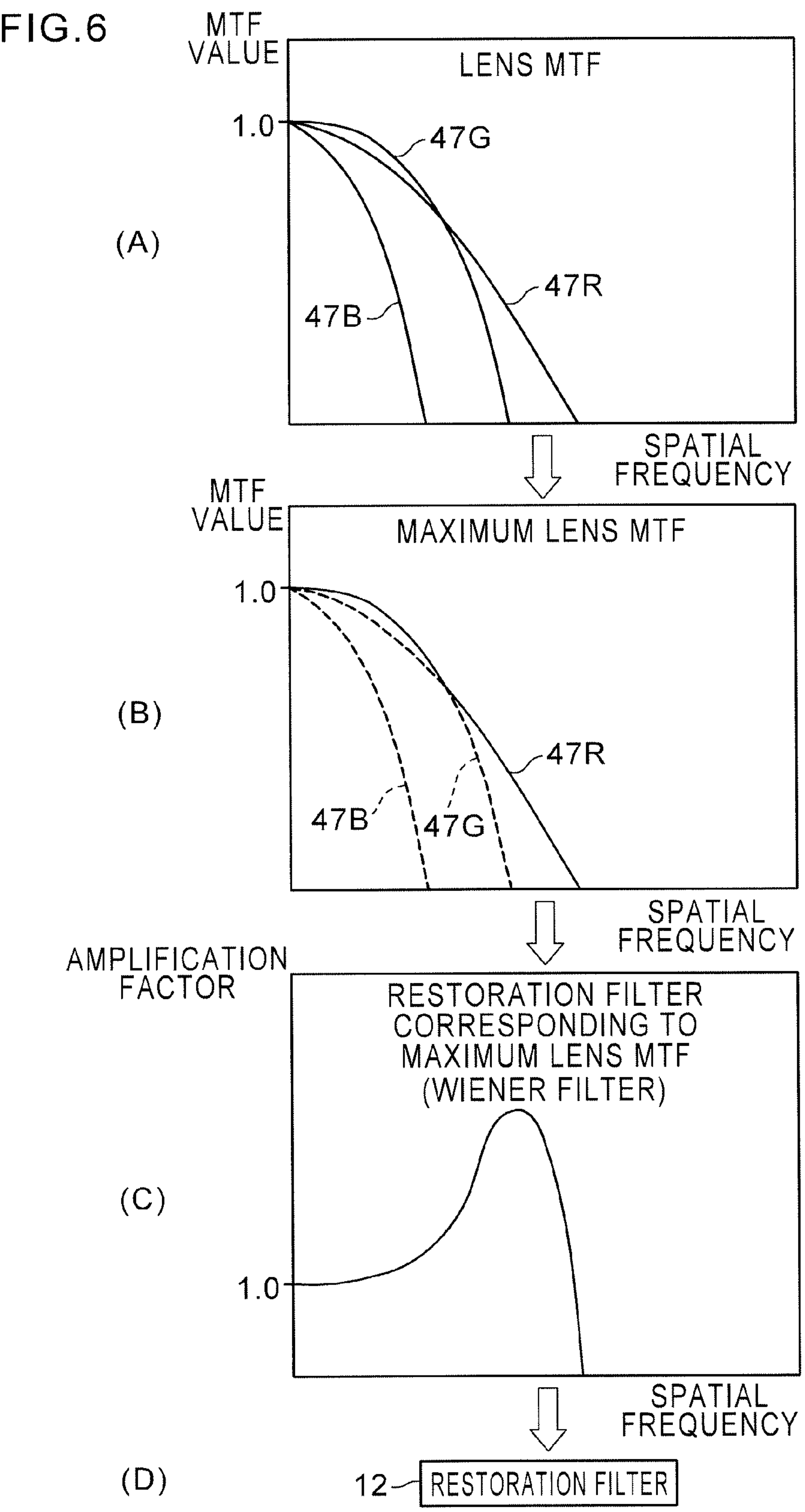
FIG. 6 is an explanatory diagram for explaining a restoration filter generation process.

As shown in the (A) portion of FIG. 6, the restoration filter generation unit 51 compares the magnitudes of the MTF values of the lens MTFs 47R, 47G, 47B for each spatial frequency, based on the frequency characteristics (spatial frequency-MTF value) of the lens MTFs 47R, 47G, 47B. Here, the frequency characteristic of the lens MTF indicates the relation between the spatial frequency and the MTF value that changes depending on the spatial frequency, and the MTF value decreases as the spatial frequency increases. Then, as shown in the (B) portion of FIG. 6, the restoration filter generation unit 51 selects, for each spatial frequency, the maximum value (shown by the solid line) of the MTF value from the lens MTFs 47R, 47G, 47B for the respective colors, and determines a maximum lens MTF. Specifically, when the frequency characteristics of the lens MTFs 47R, 47G, 47B are represented by an $MTF_R(\omega_x, \omega_y)$, an $MTF_G(\omega_x, \omega_y)$ and an $MTF_B(\omega_x, \omega_y)$ respectively, the restoration filter generation unit 51 determines an $MTF(\omega_x, \omega_y)$, which is the frequency characteristic of the maximum lens MTF, by the following Formula (1).

[Formula 1]

$$MTF(\omega_x,\omega_y)=\max\{MTF_R(\omega_x,\omega_y),MTF_G(\omega_x,\omega_y),MTF_B(\omega_x,\omega_y)\} \quad (1)$$

Subsequently, as shown in the (C) portion of FIG. 6, the restoration filter generation unit 51 computes the computation formula of a Wiener filter to be used in the generation of the restoration filter, based on the maximum lens MTF ($MTF(\omega_x, \omega_y)$). Thereby, the frequency characteristic (spatial frequency-amplification factor) of the Wiener filter is determined. Here, the spatial frequency of the Wiener filter indicates the relation between the spatial frequency and the amplification factor corresponding to the decrease in the MTF value for each spatial frequency. On this occasion, the frequency characteristic of the restoration filter corresponding to the maximum lens MTF is determined, because the Wiener filter is the restoration filter corresponding to the maximum lens MTF. Here, the computation formula itself of the Wiener filter is known (for example, see Formulas (8) and (9) described later), and the method for determining the frequency characteristic of the restoration filter corresponding to the lens MTF using the computation formula is also known. Therefore, the specific explanation is omitted herein.

As shown in the (D) portion of FIG. 6, the filter coefficient of the restoration filter 12 that achieves the frequency characteristic in the luminance system is determined based on the frequency characteristic of the Wiener filter corresponding to the maximum lens MTF. Here, as the method for designing, from the frequency characteristic (spatial frequency-amplification factor), the restoration filter (filter coefficient) that achieves this, various known methods can be used.

Here, it is preferable that the restoration filter 12 in the luminance system is generated from the lens MTF with respect to the luminance. However, it is difficult to exactly determine the lens MTF with respect to the luminance. Therefore, in the embodiment, the restoration filter 12 in the luminance system is generated using the maximum lens MTF shown in the (B) portion of FIG. 6, instead of the lens MTF with respect to the luminance. The restoration filter 12 defines the correction amount (amplification factor) corresponding to the MTF value of the color having the highest frequency response for each spatial frequency, and therefore, the overcorrection is prevented at least for the RGB signal component (Y=0.3R+0.6G+0.1B) of the luminance system image data Y after the point-image restoration process.

The restoration filter 12 generated by the restoration filter generation unit 51 is output to the digital camera 2 through the communication I/F 44, and thereafter, is stored in the memory 14.

<Action of Restoration Filter Generation Device According to First Embodiment>

Next, the actions of the digital camera 2 and restoration filter generation device 11 having the above configurations are explained. First, the generation process of the restoration filter 12 by the restoration filter generation device 11 is explained. Here, before the generation process of the restoration filter 12 is started, the measurement of the lens MTFs 47R, 47G, 47B by the MTF measurement device 49 and the storing of the respective lens MTFs 47R, 47G, 47B in the storage 43 are executed.

When the restoration filter generation operation is performed in the operation unit 41, the device CPU 40 reads the restoration filter generation program 46 in the storage 43 to execute it, and thereby, functions as the MTF acquisition unit 50 and the restoration filter generation unit 51.

Figure 7:
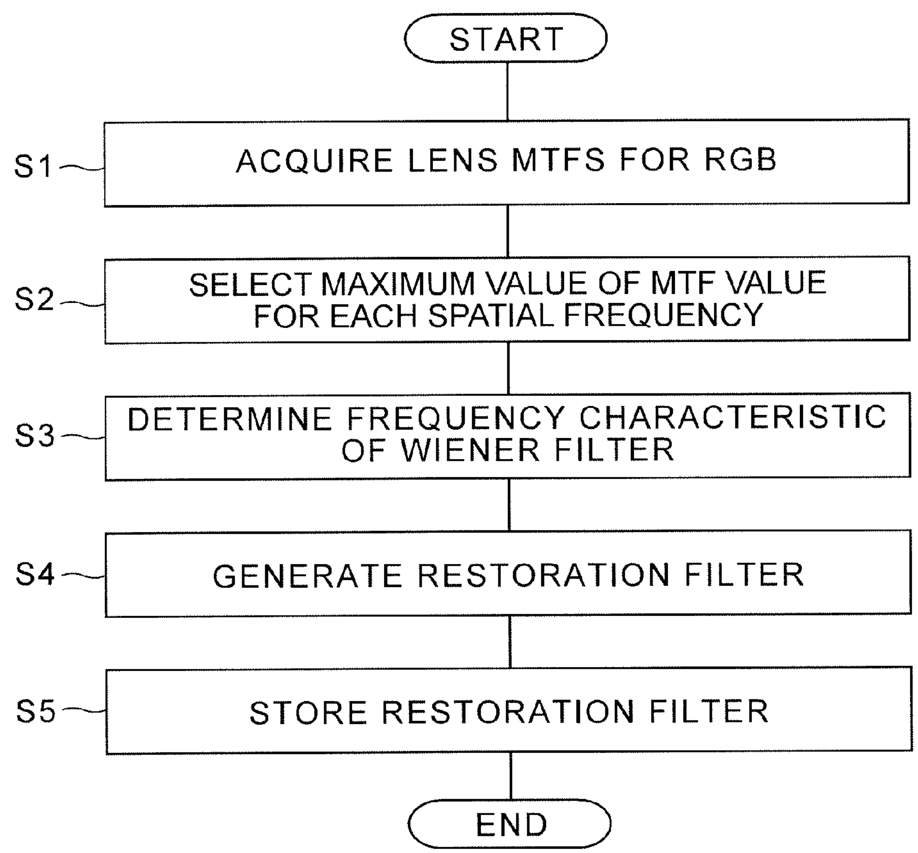
FIG. 7 is a flowchart showing the flow of the generation process of a restoration filter.

As shown in FIG. 7, the MTF acquisition unit 50 acquires the lens MTFs 47R, 47G, 47B from the storage 43, and outputs these lens MTFs 47R, 47G, 47B to the restoration filter generation unit 51 (step S1, MTF acquisition step).

As shown in the (A) portion and (B) portion of FIG. 6 and Formula (1) described above, the restoration filter generation unit 51 selects, for each spatial frequency, the maximum value of the MTF value from the lens MTFs 47R, 47G, 47B for the respective colors, and determines the $MTF(\omega_x, \omega_y)$ of the maximum lens MTF (step S2). Then, as shown in the (C) portion of FIG. 6, the restoration filter generation unit 51 computes the computation formula of the Wiener filter based on the $MTF(\omega_x, \omega_y)$ of the maximum lens MTF, and determines the frequency characteristic of the Wiener filter corresponding to the maximum lens MTF (step S3).

Subsequently, the restoration filter generation unit 51 determines the filter coefficient of the restoration filter 12 that achieves the frequency characteristic of the Wiener filter in the luminance system. Thereby, in the restoration filter generation unit 51, the restoration filter 12 is generated (step S4, restoration filter generation step). The restoration filter 12 is stored in the storage 43.

During the manufacture of the digital camera 2, the device CPU 40 reads the restoration filter 12 stored in the storage 43, and outputs it to the communication I/F 44. The communication I/F 44 outputs the restoration filter 12 to the digital camera 2, which is connected through a communication cable not illustrated. Thereby, the restoration filter 12 is stored in the memory 14 (step S5).

<Action of Digital Camera According to First Embodiment>

Next, the action of the digital camera 2 to perform the point-image restoration process using the restoration filter 12 is explained.

Figure 8:
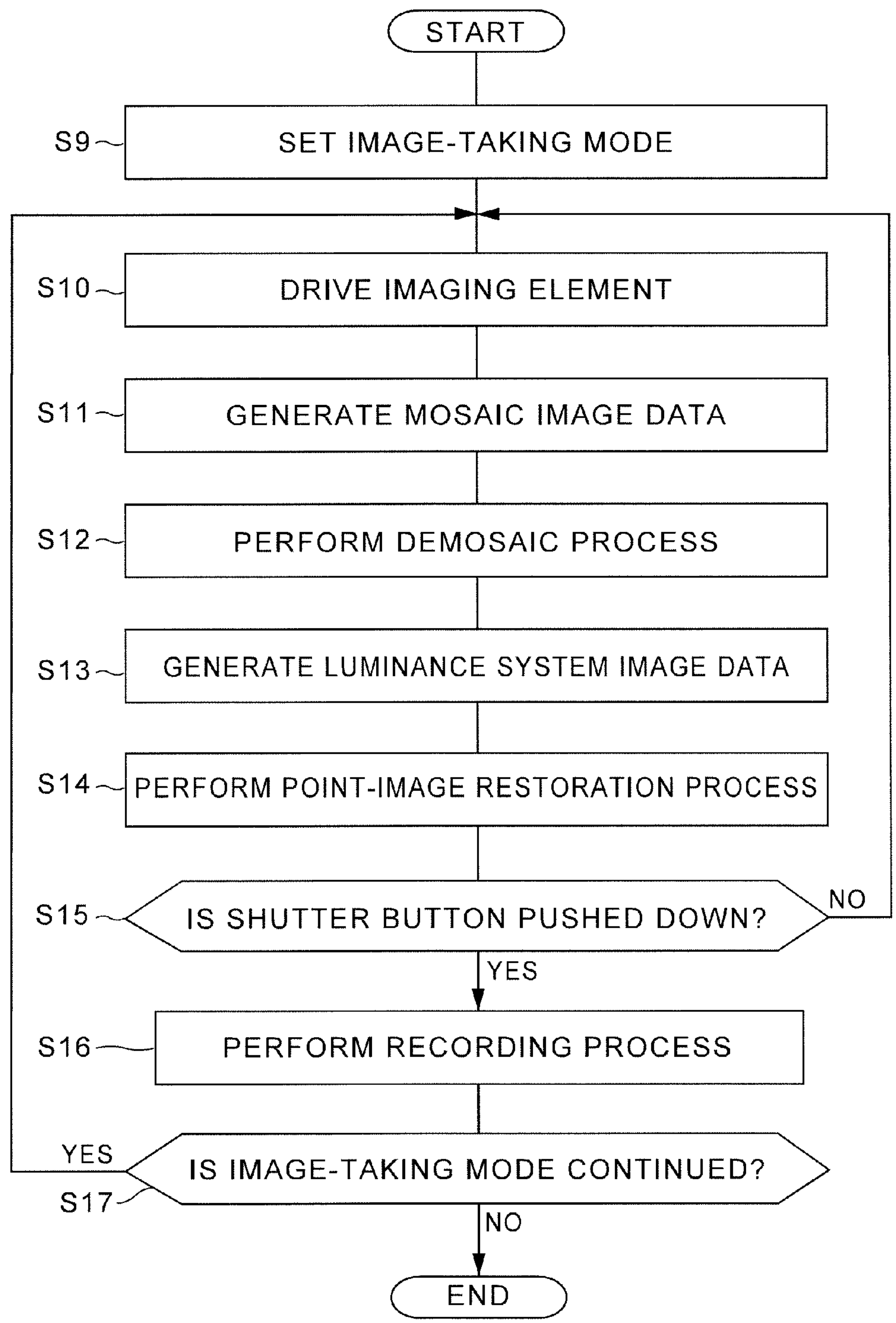
FIG. 8 is a flowchart showing the flow of an image-taking process of the digital camera.

As shown in FIG. 8, when the operation mode of the digital camera 2 is set to the image-taking mode on the operation unit 9 (step S9), the camera CPU 13 drives the color imaging element 23 through the imaging element driver 25 and starts the imaging process (step S10). The mechanical shutter 18 is opened and shut at a predetermined shutter speed, and signal charges are accumulated in each of the pixels of the color imaging element 23. Then, under the control by the imaging element driver 25, the signal is output from each pixel of the color imaging element 23.

The signal adjustment circuit 28 generates the mosaic image data R1, G1, B1 of RGB by performing various signal adjustment processes on the output signal output from the color imaging element 23, and outputs the respective mosaic image data R1, G1, B1 to the image processing circuit 29 (step S11). The respective mosaic image data R1, G1, B1 are input to the demosaic processing unit 36 through the input unit 35. The demosaic processing unit 36 generates the RGB image data R2, G2, B2 by performing the demosaic process on the mosaic image data R1, G1, B1, and outputs the RGB image data R2, G2, B2 to the conversion unit 37 (step S12).

The conversion unit 37 generates the luminance system image data Y and the color-difference system image data Cb, Cr by performing the YC conversion process on the RGB image data R2, G2, B2 (step S13, image data generation step). Then, the conversion unit 37 outputs the luminance system image data Y to the point-image restoration processing unit 38.

When the operation mode of the digital camera 2 is set to the image-taking mode, the point-image restoration processing unit 38 reads the restoration filter 12 that is previously stored in the memory 14. Then, as shown in the above-described (A) and (B) portion of FIG. 5, the point-image restoration processing unit 38 performs the point-image restoration process on the luminance system image data Y input from the conversion unit 37, using the restoration filter 12 (step S14, restoration processing step). The luminance system image data Y after the point-image restoration process, and the color-difference system image data Cb, Cr that are not targets of the point-image restoration process, are stored in the VRAM region of the memory 14, as the taken image data.

The image processing circuit 29 (the camera CPU 13 may be adopted) generates the live view image data from the taken image data stored in the VRAM region of the memory 14, and outputs it to the display unit 8. Thereby, the live view image is displayed on the display unit 8. Thereafter, the processes of step S10 to step S14 are repeatedly executed until the shutter button 6 is pushed down (NO in step S15).

When the shutter button 6 is pushed down (YES in step S15), the taken image data (the luminance system image data Y after the point-image restoration process, and the color-difference system image data Cb, Cr) equivalent to one frame is generated in the image processing circuit 29, and is stored in the VRAM region of the memory 14. The taken image data is compressed in the compression/decompression processing circuit 31, and thereafter, is recorded in the memory card 10 through the medium I/F 32 (step S16). Thereafter, the above-described processes are repeatedly executed until the image-taking mode is finished (step S17).

Here, in the embodiment, the point-image restoration process is performed when the live view image is displayed, but the point-image restoration process does not need to be performed when the live view image is displayed (step S14 is omitted). In this case, when the shutter button 6 is pushed down, the processes of step S11 to step S14 may be executed to the output signal output from the color imaging element 23, and thereby, the taken image data for the recording may be generated. Thereby, it is possible to decrease the load of the computation process.

Function Effect of First Embodiment

Figure 9:
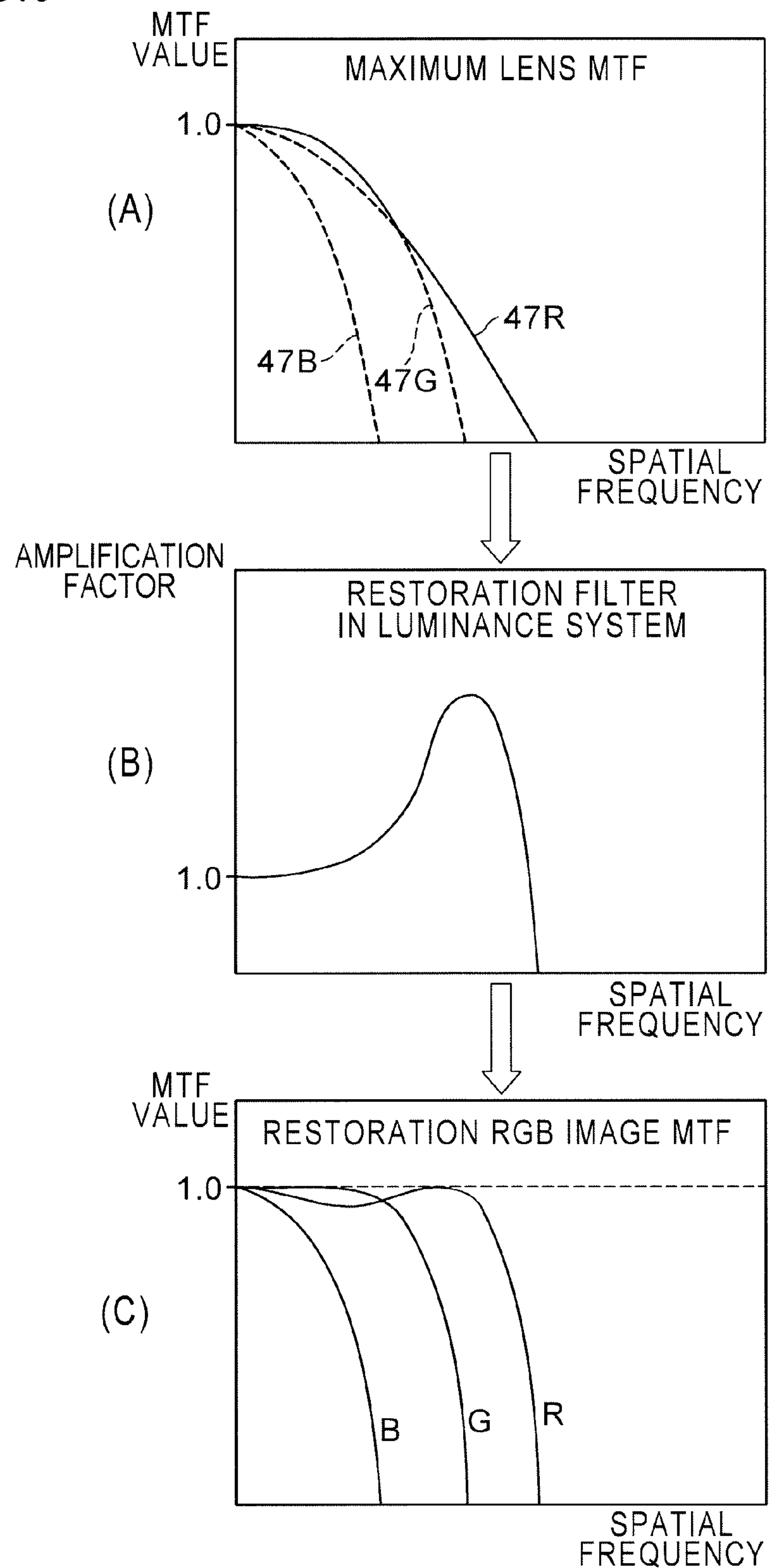
FIG. 9 is an explanatory diagram for explaining a point-image restoration process.

On this occasion, as shown in the (A) portion and (B) portion of FIG. 9, in the embodiment, the point-image restoration process is performed, using the restoration filter 12 generated with use of the maximum lens MTF, that is, using the restoration filter 12 having the correction amount (amplification factor) corresponding to the lens MTF value of the color having the highest frequency response for each spatial frequency. As described above, this results in the prevention of the overcorrection of the MTF value of the RGB signal component (Y=0.3R+0.60+0.1B) of the luminance system image data Y after the point-image restoration process.

The prevention of the overcorrection of the MTF value of the RGB signal component of the luminance system image data Y in this way makes a certain degree of effect of suppressing the overcorrection of the MTF value for each color of the restoration RGB image data corresponding to the luminance system image data Y. Therefore, as shown in the (C) portion of FIG. 9, by performing the point-image restoration process using the restoration filter 12 generated with use of the maximum lens MTF, a certain degree of effect of suppressing the MTF value for each color of the restoration RGB image data corresponding to the luminance system image data Y after the point-image restoration process to 1.0 or less is expected.

Figure 10:
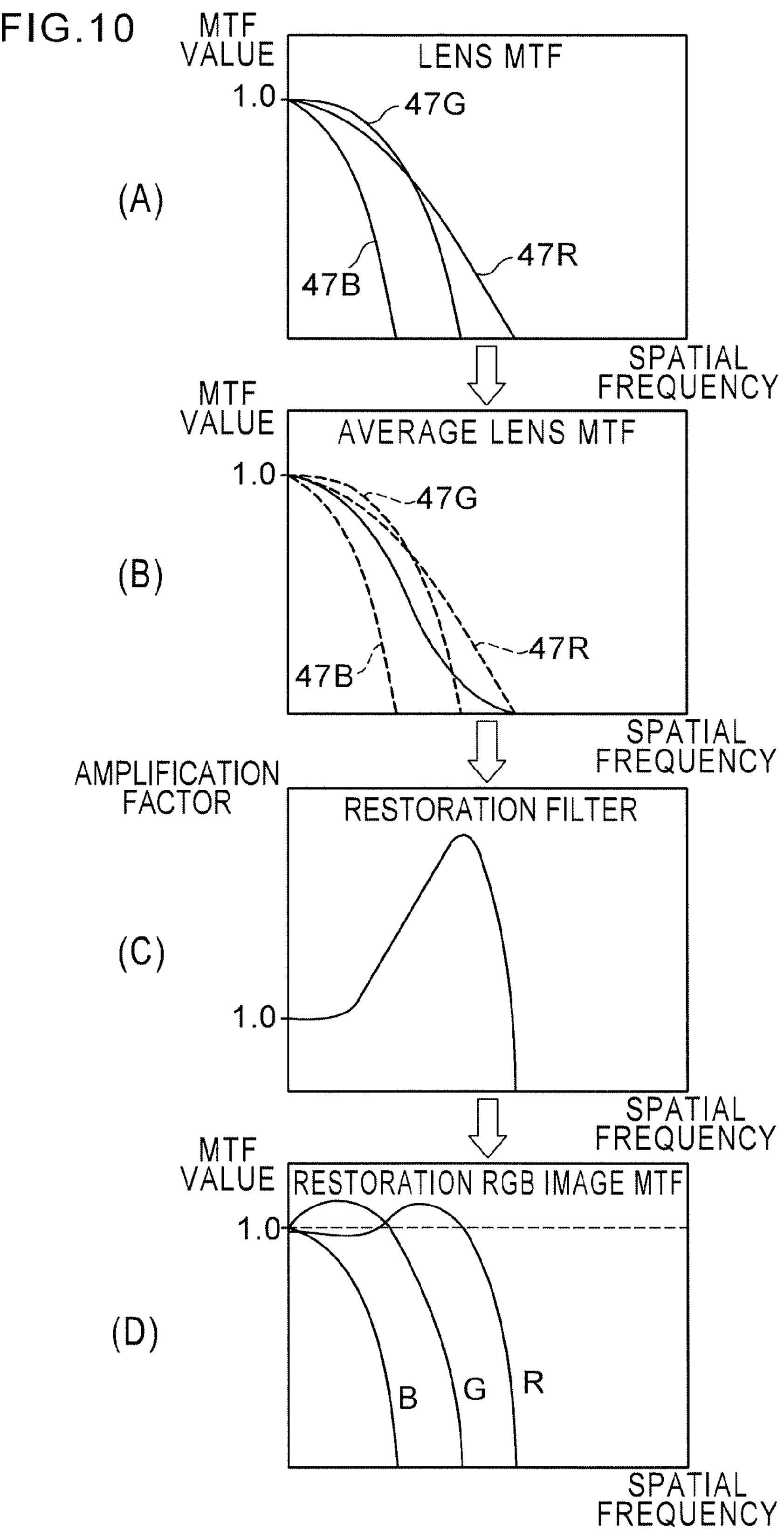
FIG. 10 is an explanatory diagram for explaining a comparative example in which a point-image restoration process is performed using a conventional restoration filter.

In contrast, in a comparative example shown in the (A) portion to (D) portion of FIG. 10, the average value of the MTF values of the lens MTFs 47R, 47G, 47B for the respective colors is determined for each spatial frequency (the (A) portion and (B) portion of FIG. 10), and based on an average lens MTF that is the average value, the restoration filter in the luminance system is generated (the (C) portion of FIG. 10). In this case, there is a fear that the overcorrection of the MTF value occurs depending on the color of the restoration RGB image data. For example, in the (B) portion of FIG. 10, the lens MTF 47B has a lower value than the average lens MTF, and therefore, there is no fear that the overcorrection of the MTF value of the restoration B image data occurs, even when the point-image restoration process is performed with the restoration filter shown in the (C) portion of FIG. 10. However, the lens MTFs 47G, 47R basically has a higher value than the average lens MTF. Therefore, when the point-image restoration process is performed with the restoration filter shown in the (C) portion of FIG. 10, there is a fear that the G signal and the R signal are excessively emphasized as shown in the (D) portion of FIG. 10 and thereby the overcorrection of the MTF values of the restoration R image data and the restoration G image data occurs.

On the contrary to such a comparative example, in the embodiment, the point-image restoration process is performed using the restoration filter 12 generated with use of the maximum lens MTF, and thereby, it is possible to reduce the occurrence of overcorrection of the MTF value for each color of the restoration RGB image data, relative to the comparative example.

Second Embodiment

Next, a restoration filter generation device according to a second embodiment of the present invention is explained. The above restoration filter 12 according to the first embodiment shown in the (B) portion of FIG. 9 is designed to correspond to the lens MTFs 47R, 47G also, which are higher in the MTF value than the lens MTF 47B in a high frequency region. Therefore, since the restoration filter 12 is designed such that the amplification factor in a high frequency region (a low SN ratio region in FIG. 15) is high, there is a fear that an excessive frequency emphasis is applied in a region where the SN ratio of the B signal is low (hereinafter, referred to as a low SN ratio region, see FIG. 15) and thereby the noise of the B signal is amplified.

Hence, the restoration filter generation device according to the second embodiment generates a restoration filter that can prevent the side effect that the frequency characteristic of a restoration filter designed on the basis of a color having a high MTF value amplifies the noise for another color.

<Configuration of Restoration Filter Generation Device>

Figure 11:
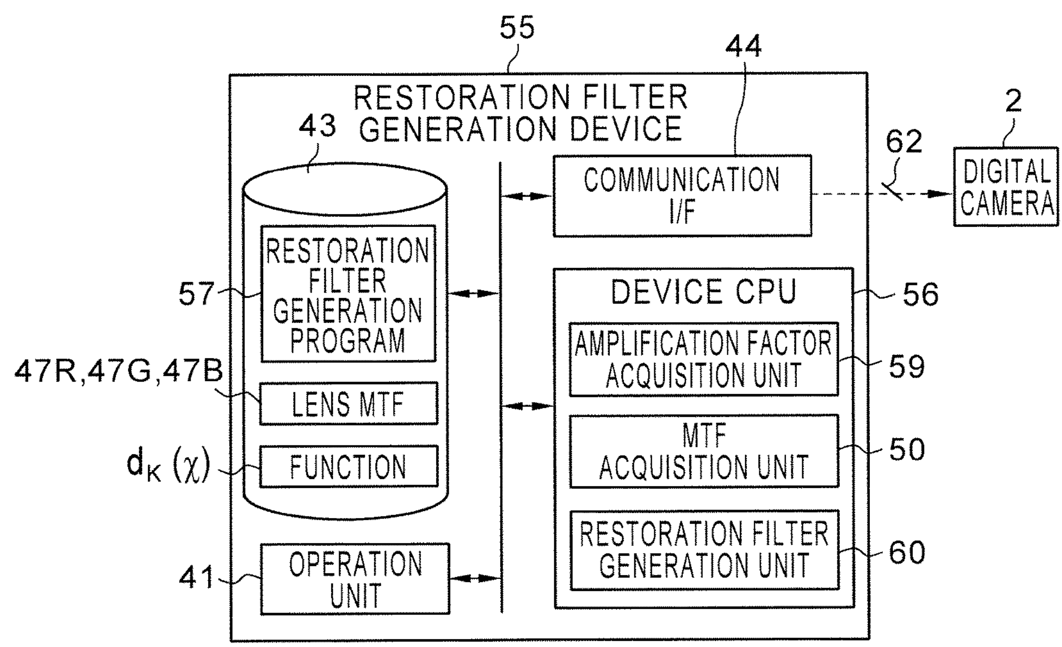
FIG. 11 is a block diagram showing the electric configuration of a restoration filter generation device according to a second embodiment.

As shown in FIG. 11, a restoration filter generation device 55 according to the second embodiment basically has the same configuration as the first embodiment, except that a device CPU 56 is included, and that a restoration filter generation program 57 (corresponding to a program according to the present invention) and a function $d_K(\chi)$ corresponding to an amplification factor according to the present invention are stored in the storage 43. Therefore, for constituents having the same functions and configurations as the above first embodiment, the same reference characters and the same reference numerals are assigned, and the explanation is omitted.

When the restoration filter generation operation is performed in the operation unit 41, the device CPU 56 reads the restoration filter generation program 57 from the storage 43 to execute it, and thereby, functions as an amplification factor acquisition unit (amplification factor acquisition device) 59 and a restoration filter generation unit (restoration filter generation device) 60, in addition to the above-described MTF acquisition unit 50.

When an amplification factor $\chi$ (≥0) of the restoration filter in the luminance system is given, the amplification factor acquisition unit 59 determines, by a computation process, the function $d_K(\chi)$, $K\in\{R, G, B\}$ that gives the amplification factor of each MTF value of the restoration RGB image data, and stores it in the storage 43. The computation process of determining the function $d_K(\chi)$ and the storing in the storage 43 are previously executed before the generation of the restoration filter. In the following, the computation process of the function $d_K(\chi)$ is explained.

<Computation Process of Function $d_K(\chi)$>

Figure 12:
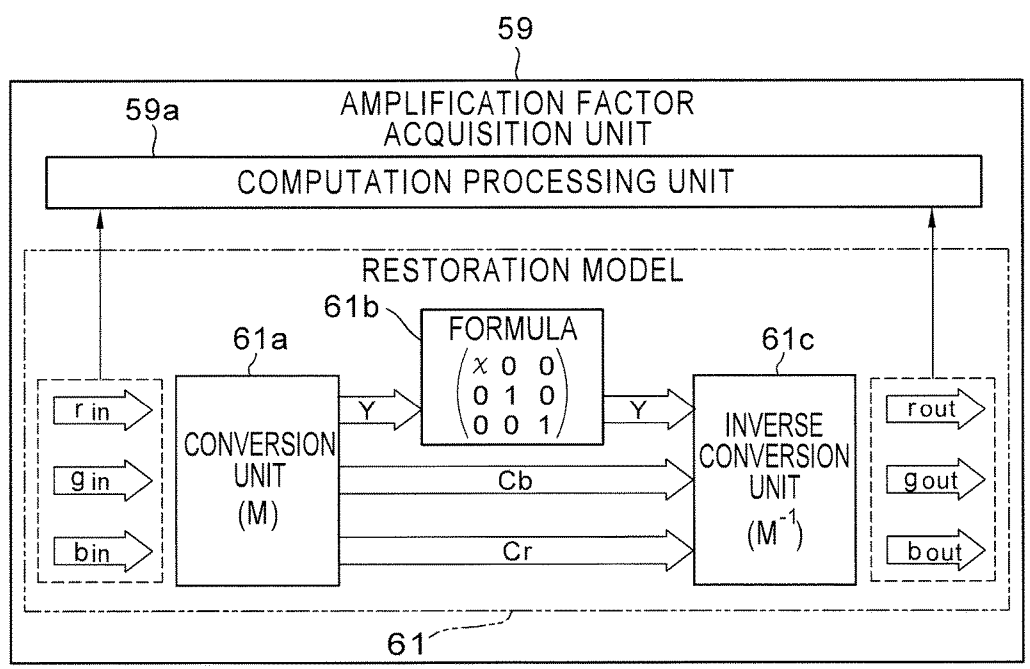
FIG. 12 is an explanatory diagram for explaining an amplification factor acquisition unit.

As shown in FIG. 12, a computation processing unit 59*a* of the amplification factor acquisition unit 59 estimates, using a restoration model 61 in the luminance system, the gains (the levels of the influence on the MTF) for the respective planes of RGB of the restoration RGB image data when the restoration filter in the luminance system multiplies the luminance gain by "$\chi$." Here, for the restoration model 61, a conversion unit 61*a*, a formula 61*b* and an inverse conversion unit 61*c* are used, for example.

The conversion formula 61*a* is an arbitrary conversion formula that converts input image data (signal, pixel value) $r_{in}$, $g_{in}$, $b_{in}$ into the luminance system image data (signal) Y and the color-difference system image data (signal) Cb, Cr, and is represented by "M." The formula 61*b* is utilized for the above-described estimation, and is different from the actual restoration filter. The inverse conversion unit 61*c* is an arbitrary conversion formula that inversely converts the luminance system image data Y and the color-difference system image data Cb, Cr into output image data (signal, pixel value) $r_{out}$, $g_{out}$, $b_{out}$, and is represented by "$M^{-1}$." The relation between the input image data $r_{in}$, $g_{in}$, $b_{in}$, and the output image data $r_{out}$, $g_{out}$, $b_{out}$ in the case of using the restoration model 61 is expressed as the following Formula (2).

[Formula 2]

$$\begin{pmatrix} r_{out} \\ g_{out} \\ b_{out} \end{pmatrix} = M^{-1}\begin{pmatrix} x & 0 & 0 \\ 0 & 1 & 0 \\ 0 & 0 & 1 \end{pmatrix} M \begin{pmatrix} r_{in} \\ g_{in} \\ b_{in} \end{pmatrix} \tag{2}$$

Here, generally, the conversion from an RGB space into a YCbCr space involves a gamma correction, and therefore, a non-linear conversion is necessary. However, in some cases, a linear conversion is adopted depending on the implementation form of the luminance system restoration process. By utilizing this, the MTF amplification factors for the respective planes of RGB are expressed as the following Formula (3).

[Formula 3]

$$d_R(x|r_{in},g_{in},b_{in})=r_{out}/r_{in}$$

$$d_G(x|r_{in},g_{in},b_{in})=g_{out}/g_{in}$$

$$d_B(x|r_{in},g_{in},b_{in})=b_{out}/b_{in} \tag{3}$$

As shown in the above Formula (3), the MTF amplification factors for the respective planes of RGB are influenced by not only the filter amplification facto "$\chi$" but also the input image data $r_{in}$, $g_{in}$, $b_{in}$. However, from the standpoint of computation amount reduction, it is difficult to apply a restoration filter for which all of the input image data $r_{in}$, $g_{in}$, $b_{in}$ are exactly considered. Therefore, as shown in the following Formula (4), the computation processing unit 59*a* determines $d_K(\chi)$ by assuming a prior distribution w ($r_{in}$, $g_{in}$, $b_{in}$) of the input image data $r_{in}$, $g_{in}$, $b_{in}$ and taking an expected value with respect to this. Then, the computation processing unit 59*a* stores the function $d_K(\chi)$ in the storage 43. Here, "Z" in Formula (4) is a normalization constant resulting from integrating the prior distribution w ($r_{in}$, $g_{in}$, $b_{in}$) over the whole domain.

[Formula 4]

$$d_K(x) = \frac{1}{Z}\int\int\int d_K(x \mid r_{in}, g_{in}, b_{in}) w(r_{in}, g_{in}, b_{in}) dr_{in} dg_{in} db_{in} \tag{4}$$

Returning to FIG. 11, in the generation of the restoration filter, the amplification factor acquisition unit 59 acquires the function $d_K(\chi)$ from the storage 43, and outputs it to the restoration filter generation unit 60.

<Restoration Filter Generation Process>

Similarly to the restoration filter 12 according to the first embodiment, the restoration filter generation unit 60, based on the lens MTFs 47R, 47G, 47B, generates a restoration filter 62 in the luminance system that suppresses the over-correction of the MTF value of the restoration RGB image data, that is, that suppresses the MTF value to 1.0 or less.

Figure 13:
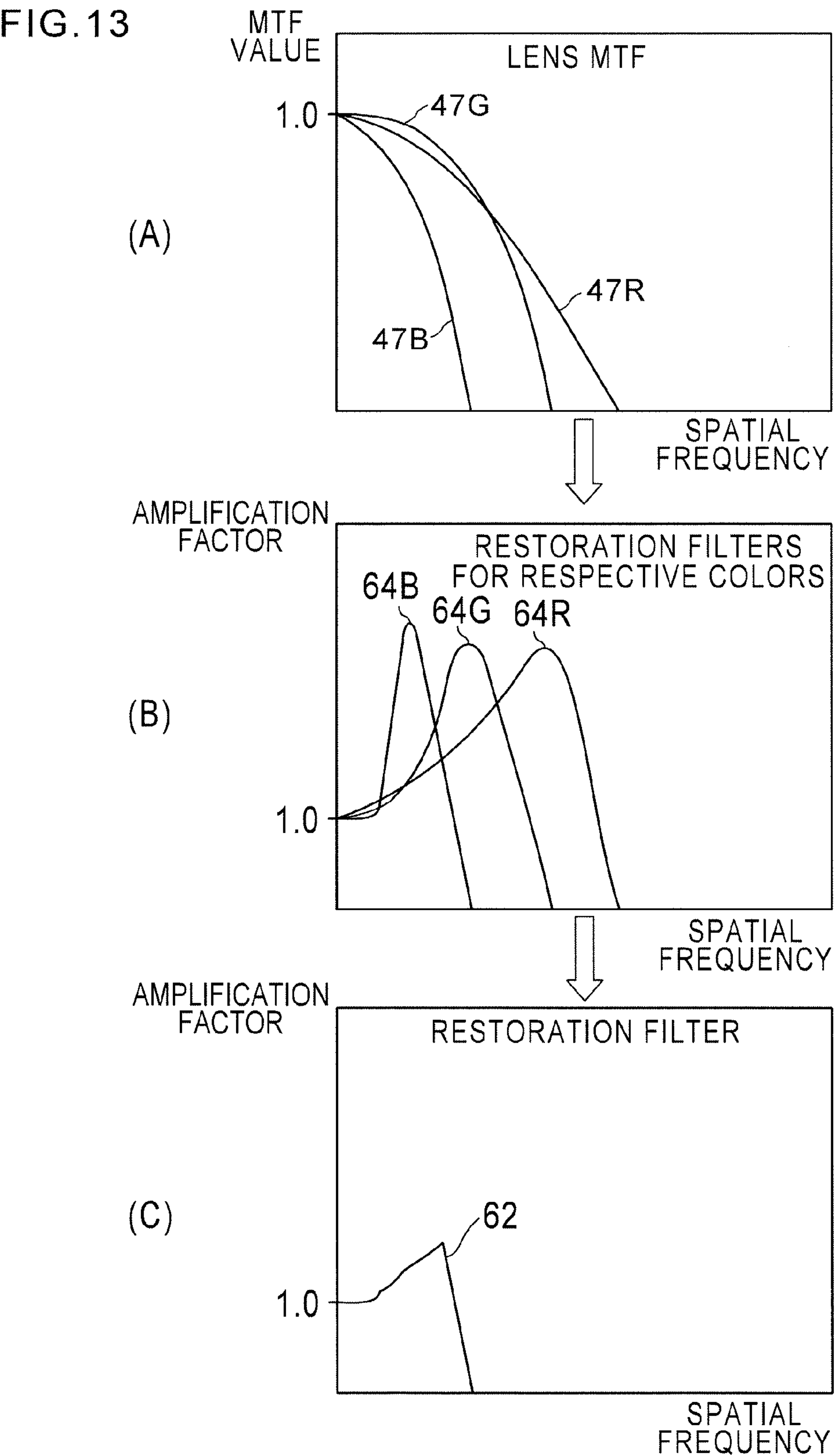
FIG. 13 is an explanatory diagram for explaining a restoration filter generation process according to the second embodiment.

As shown in the (A) portion and (B) portion of FIG. 13, based on the frequency characteristics of the lens MTFs 47R, 47G, 47B, the restoration filter generation unit 60 calculates the frequency characteristics (spatial frequency-amplification factor) of the restoration filters for the respective colors of RGB corresponding to the lens MTFs 47R, 47G, 47B respectively. The restoration filters for the respective colors are a restoration filter 64R for the R color, a restoration filter 64G for the G color and a restoration filter 64B for the B color.

Specifically, when the frequency characteristics of the restoration filters 64R, 64G, 64B for the respective colors at a frequency $(\omega_x, \omega_y)$ are represented by $h_R(\omega_x, \omega_y)$, $h_G(\omega_x, \omega_y)$ and $h_B(\omega_x, \omega_y)$ respectively, the restoration filter generation unit 60 determines these by the following computation formula (5) of the Wiener filter, respectively. Here, $K \in \{R, G, B\}$ is held. Further, $S_K(\omega_x, \omega_y)$ and $N_K(\omega_x, \omega_y)$ represent the signal power and noise power for each color, respectively, and already-known values that are previously determined.

[Formula 5]

$$h_K(\omega_x, \omega_y) = \frac{MTF_K^*(\omega_x, \omega_y)}{\|MTF_K(\omega_x, \omega_y)\|^2 + N_K(\omega_x, \omega_y)/S_K(\omega_x, \omega_y)} \tag{5}$$

Subsequently, the restoration filter generation unit 60 selects, for each spatial frequency, the minimum value of the amplification factors of the restoration filters 64R, 64G, 64B for the respective colors, and generates the restoration filter 62 in the luminance system based on the minimum value of the amplification factor for each spatial frequency and the function $d_K(\chi)$. Specifically, when the frequency characteristic of the restoration filter 62 in the luminance system is represented by $f(\omega_x, \omega_y)$, the restoration filter generation unit 60 calculates the frequency characteristic $f(\omega_x, \omega_y)$ shown in the (C) portion of FIG. 13, based on the following Formula (6), and determines the filter coefficient of the restoration filter 62 that achieves the frequency characteristic $f(\omega_x, \omega_y)$. Thereby, the restoration filter 62 is generated. Similarly to the first embodiment, the restoration filter 62 is stored in the memory 14 of the digital camera 2.

[Formula 6]

$$f(\omega_x,\omega_y)=\min\{d_R^{-1}(h_R(\omega_x,\omega_y)),d_G^{-1}(\omega_x,\omega_y)),d_B^{-1}(h_B(\omega_x,\omega_y))\} \tag{6}$$

<Action of Restoration Filter Generation Device According to Second Embodiment>

Figure 14:
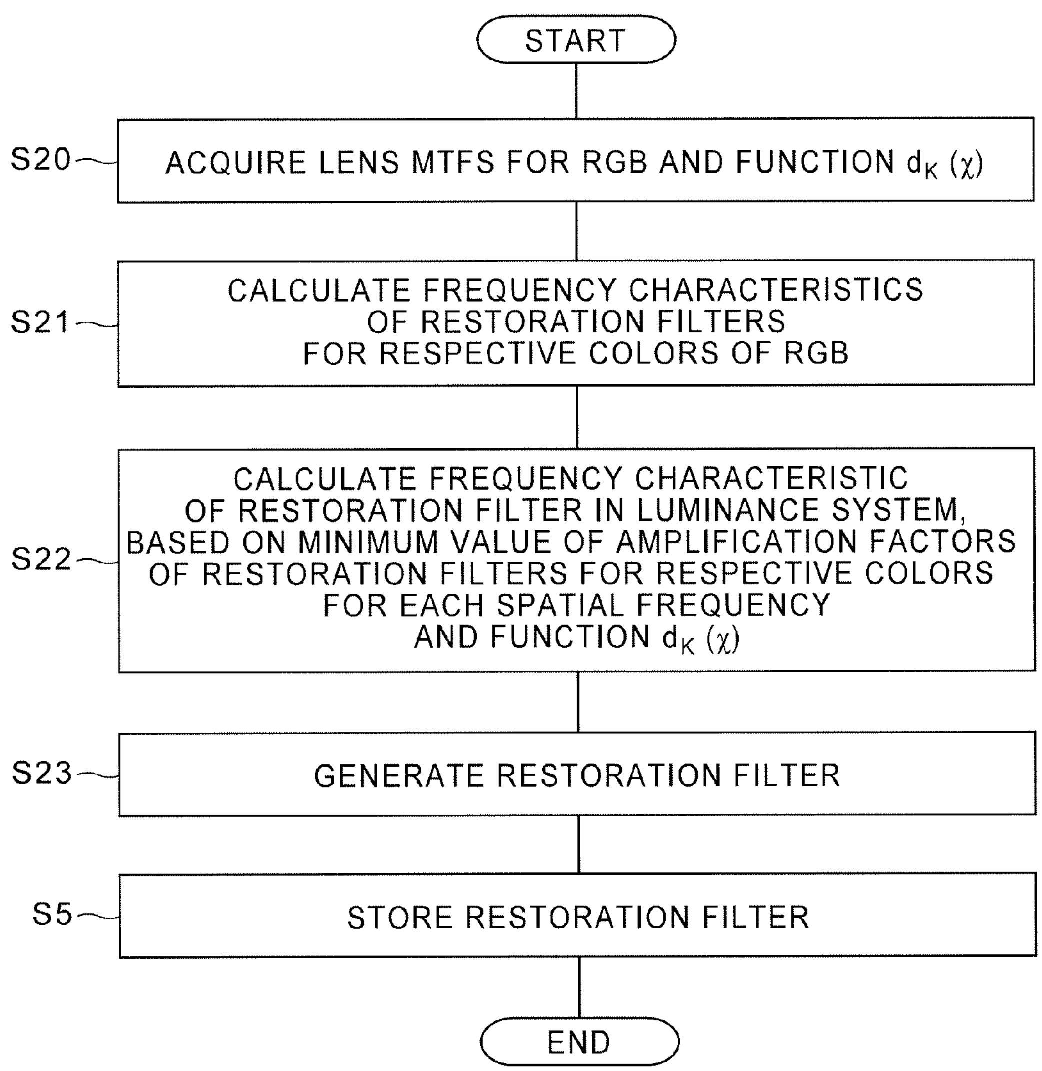
FIG. 14 is a flowchart showing the flow of the generation process of a restoration filter according to the second embodiment.

Next, the generation process of the restoration filter 62 by the restoration filter generation device 55 having the above configuration is explained using FIG. 14. Here, before the generation process of the restoration filter 62 is started, the measurement and storing of the lens MTFs 47R, 47G, 47B by the MTF measurement device 49 and the calculation and storing of the function $d_K(\chi)$ by the computation processing unit 59*a* are executed.

When the restoration filter generation operation is performed in the operation unit 41, the device CPU 56 reads the restoration filter generation program 57 in the storage 43 to execute it, and thereby, functions as the MTF acquisition unit 50, the amplification factor acquisition unit 59 and the restoration filter generation unit 60.

The MTF acquisition unit 50 acquires the lens MTFs 47R, 47G, 47B from the storage 43, and outputs the respective lens MTFs 47R, 47G, 47B to the restoration filter generation unit 60 (step S20). Further, the amplification factor acquisition unit 59 acquires the function $d_K(\chi)$ from the storage 43, and outputs the function $d_K(\chi)$ to the restoration filter generation unit 60 (step S20).

The restoration filter generation unit 60 calculates each of the frequency characteristics $h_R(\omega_x, \omega_y)$, $h_G(\omega_x, \omega_y)$ and $h_B(\omega_x, \omega_y)$ of the restoration filters 64R, 64G, 64B for the respective colors by the above-described Formula (5), based on the lens MTFs 47R, 47G, 47B acquired from the MTF acquisition unit 50 and the already-known $S_K$ and $N_K$ (step S21).

Subsequently, the restoration filter generation unit 60 calculates the frequency characteristic $f(\omega_x, \omega_y)$ of the restoration filter 62 in the luminance system by the above-described Formula (6), based on the frequency characteristics $h_R(\omega_x, \omega_y)$, $h_G(\omega_x, \omega_y)$ and $h_B(\omega_x, \omega_y)$ and the function $d_K(\chi)$. That is, the restoration filter generation unit 60 calculates the frequency characteristic $f(\omega_x, \omega_y)$ of the restoration filter 62, based on the minimum value of the amplification factors of the restoration filters 64R, 64G, 64B for the respective colors at each spatial frequency and the function $d_K(\chi)$ (step S22).

The restoration filter generation unit 60 determines the filter coefficient of the restoration filter 62 that achieves the frequency characteristic $f(\omega_x, \omega_y)$, based on the calculation result of the frequency characteristic $f(\omega_x, \omega_y)$. Thereby, in the restoration filter generation unit 60, the restoration filter 62 is generated (step S23). The restoration filter 62 is stored in the storage 43. Thereafter, similarly to the first embodiment, the restoration filter 62 is stored in the memory 14 (step S5).

<Action of Digital Camera According to Second Embodiment>

The imaging process in the digital camera 2 according to the second embodiment is basically the same as the flow of the imaging process in the first embodiment shown in FIG. 8, except that the point-image restoration process is performed using the restoration filter 62 instead of the restoration filter 12 according to the first embodiment, and therefore, the explanation is omitted herein.

Function Effect of Second Embodiment

In the digital camera 2 according to the second embodiment, the point-image restoration process is performed using the restoration filter 62 generated based on the minimum value of the amplification factors of the restoration filters 64R, 64G, 64B for the respective colors at each spatial frequency and the function $d_K(\chi)$ that gives the amplification factor of each MTF value of the restoration RGB image data with respect to the amplification factor x of the restoration filter in the luminance system. That is, in the second embodiment, the point-image restoration process is performed using the restoration filter 62 designed on the basis of a color having a low MTF value for each spatial frequency, and therefore, each MTF value of the restoration RGB image data is suppressed to 1.0 or less. Further, since the function $d_K(\chi)$ is used in the generation of the restoration filter 62, it is possible to consider the difference in frequency amplification factor among the respective planes of RGB in the luminance correction system.

Figure 15:
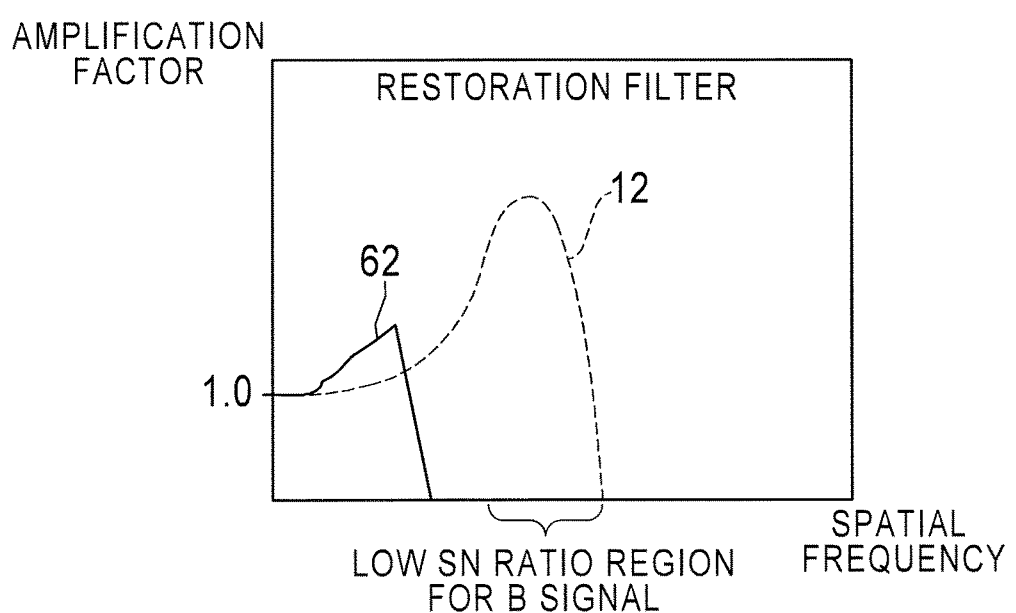
FIG. 15 is an explanatory diagram for explaining a function effect of the second embodiment.

Moreover, as shown in FIG. 15, since the point-image restoration process is performed using the restoration filter 62 designed on the basis of a color having a low MTF value for each spatial frequency, the application of an excessive frequency emphasis in the low SN ratio region for the B signal is prevented unlike the case of using the restoration filter 12 according to the first embodiment. As a result, it is possible to suppress the amplification of the noise for the B signal. That is, it is possible to prevent the amplification of the noise for another color (in the embodiment, the B color) due to the frequency characteristic of a restoration filter (for example, the restoration filter 12) designed on the basis of a color having a high MTF in a particular spatial frequency.

Further, in the above Formula (5), the frequency characteristics $h_R$, $h_G$, $h_B$ of the restoration filters 64R, 64G, 64B for the respective colors are determined based on the signal power $S_K$ and noise power $N_K$ individualized for each color of RGB, and based on this result, the frequency characteristic f of the restoration filter 62 is determined by the above Formula (6). Thereby, it is possible to individually set the assumed signal power and noise power for each color, and it is possible to prevent the overcorrection that is caused by the difference in the signal and noise powers assumed for each color.

Third Embodiment

Figure 16:
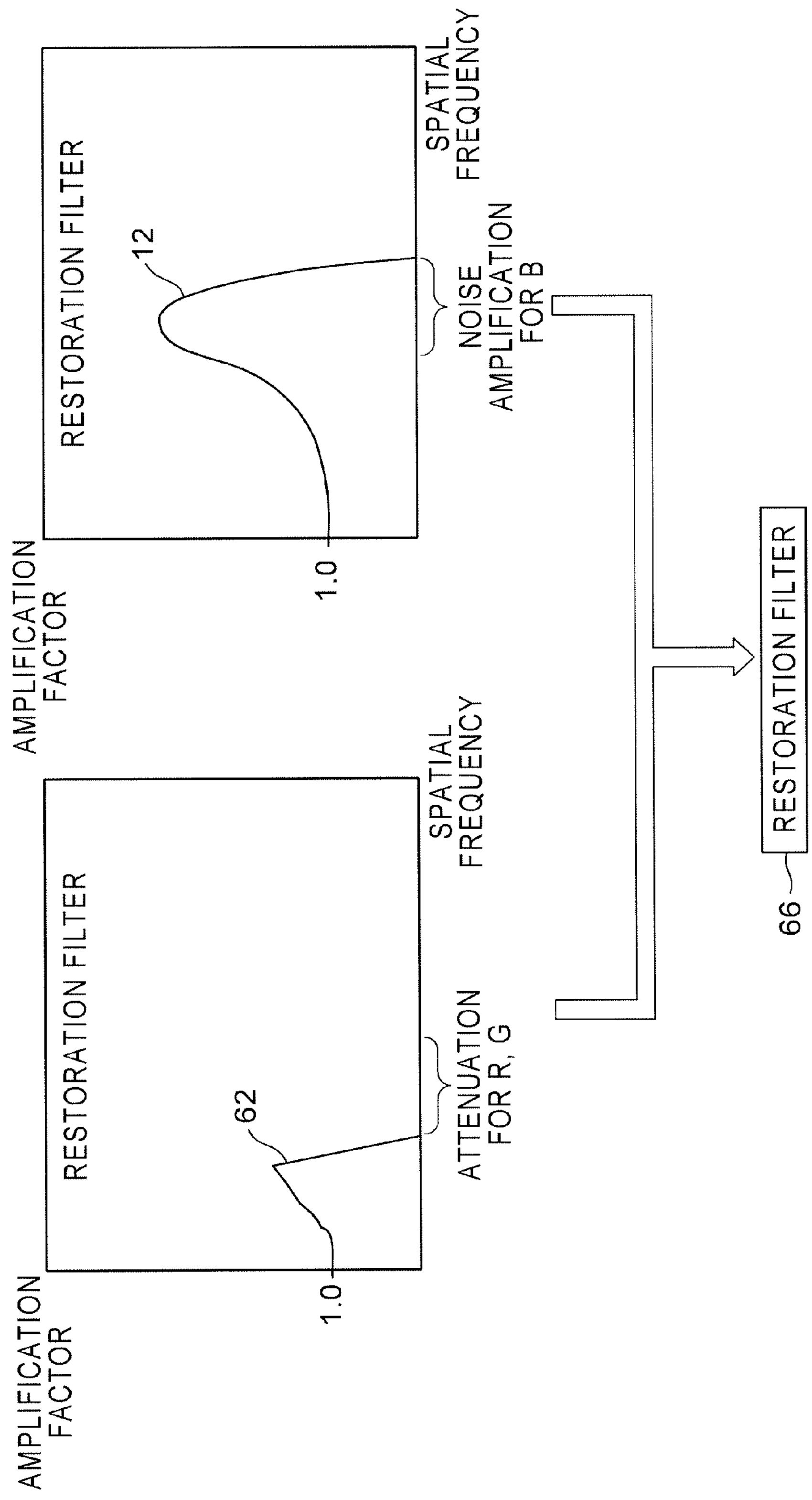
FIG. 16 is an explanatory diagram for explaining a restoration filter according to a third embodiment.

Next, a restoration filter generation device according to a third embodiment of the present invention is explained. As shown in FIG. 16, when the point-image restoration process is performed using the above restoration filter 62 according to the second embodiment, the application of an excessive frequency emphasis in the low SN ratio region for the B signal is prevented, but on the contrary, frequency emphasis is not applied in the frequency region for the R and G signals that corresponds to the low SN ratio region. Therefore, there is a fear that the R and G signals attenuate. Further, as described above, when the point-image restoration process is performed using the above restoration filter 12 according to the first embodiment, there is a fear that an excessive frequency emphasis is applied in the low SN ratio region for the B signal and the noise for the B signal is amplified.

Hence, the restoration filter generation device according to the third embodiment generates a restoration filter 66 meeting an intermediate solution that makes it possible to suppress both of the attenuation for the R and G signals and the amplification of the noise for the B signal.

<Configuration of Restoration Filter Generation Device According to Third Embodiment>

Figure 17:
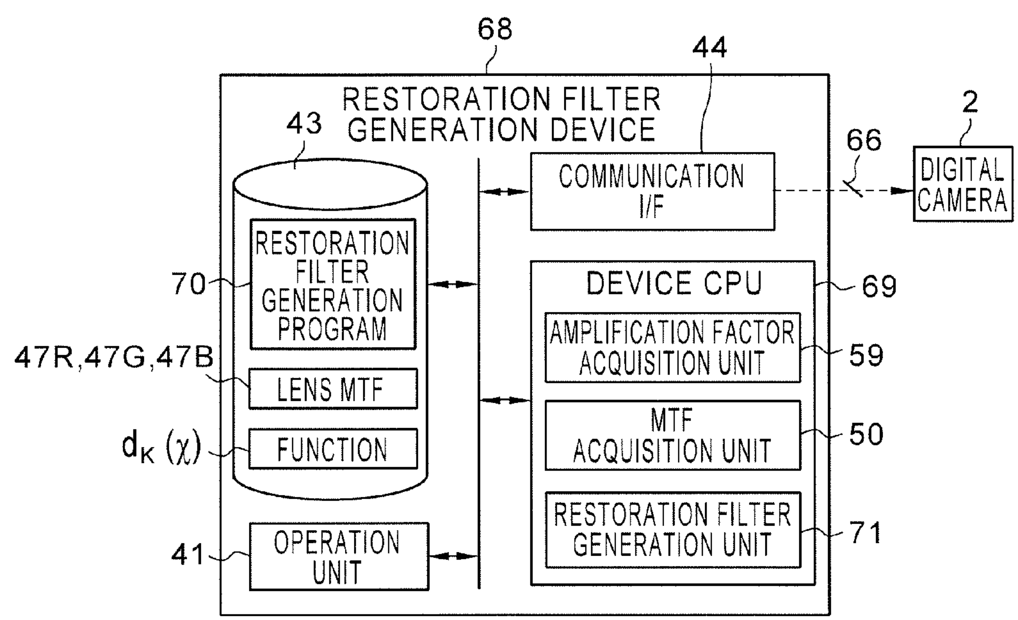
FIG. 17 is a block diagram showing the electric configuration of a restoration filter generation device according to the third embodiment.

As shown in FIG. 17, a restoration filter generation device 68 according to the third embodiment basically has the same configuration as the second embodiment, except that a device CPU 69 is included, and that a restoration filter generation program 70 (corresponding to a program according to the present invention) is stored in the storage 43. Therefore, for constituents having the same functions and configurations as the above second embodiment, the same reference characters and the same reference numerals are assigned, and the explanation is omitted.

When the restoration filter generation operation is performed in the operation unit 41, the device CPU 69 reads the restoration filter generation program 70 from the storage 43, to execute it. Thereby, the device CPU 69 functions as a restoration filter generation unit (restoration filter generation device) 71, in addition to the above-described MTF acquisition unit 50 and amplification factor acquisition unit 59.

<Restoration Filter Generation Process>

The restoration filter generation unit 71 generates a restoration filter 66 in the luminance system that suppresses the overcorrection of the MTF value of the restoration RGB image data, that is, that suppresses the MTF value to 1.0 or less, based on the lens MTFs 47R, 47G, 47B and the function $d_K$ ($\chi$). On this occasion, the restoration filter generation unit 71 directly generates a restoration filter 66 meeting an intermediate solution that makes it possible to suppress both of the attenuation for the R and G signals and the amplification of the noise for the B signal. In the following, the generation process of the restoration filter 66 is specifically explained.

The restoration filter generation unit 71 acquires the lens MTFs 47R, 47G, 47B from the MTF acquisition unit 50, and acquires the function $d_K$ ($\chi$) from the amplification factor acquisition unit 59.

Further, the restoration filter generation unit 71 determines the frequency characteristic ($MTF_Y(\omega_x, \omega_y)$) of the lens MTF in the luminance system, based on already-known frequency characteristics ($MTF_K(\omega_x, \omega_y)$, $K \in \{R, G, B\}$) of the lens MTFs 47R, 47G, 47B. For example, $MTF_Y(\omega_x, \omega_y)$ is determined from the average or root-mean-square of $MTF_R(\omega_x, \omega_y)$, $MTF_G(\omega_x, \omega_y)$ and $MTF_B(\omega_x, \omega_y)$.

Moreover, the restoration filter generation unit 71 determines the signal power ($S_K(\omega_x, \omega_y)$) and noise power ($N_K(\omega_x, \omega_y)$) in the luminance system, based on already-known signal powers ($S_K(\omega_x, \omega_y)$, $K \in \{R, G, B\}$) and noise powers ($N_K(\omega_x, \omega_y)$, $K \in \{R, G, B\}$) for the respective colors, respectively. Similarly to the above-described $MTF_Y(\omega_x, \omega_y)$, they are determined from the average or root-mean-square of $S_K$ and $N_K$ ($K \in \{R, G, B\}$) for the respective colors, respectively.

Subsequently, the restoration filter generation unit 71 starts the computation process for the generation of the restoration filter 66. When the filter coefficient of the restoration filter 66 with a tap number of N×N is represented by $x \in R^{N \times N}$ and the frequency characteristic is represented by $f(\omega_x, \omega_y|x)$, the $f(\omega_x, \omega_y|x)$ is expressed as the following Formula (7). Here, N is an odd number, and M=(N−1)/2 is held. Further, each of u and v is a variable that meets −M≤u, v≤M.

[Formula 7]

$$f(\omega_x, \omega_y \mid x) = \sum_{u=-M}^{M} \sum_{v=-M}^{M} e^{-I(\omega_x u + \omega_y v)} [x]_{u+M+1, v+M+1} \tag{7}$$

As shown in the following Formula (8), the restoration filter generation unit 71 determines the filter coefficient x that minimizes a functional J [x] defined by the following Formula (9), under the condition following "s.t." in Formula (8).

Here, "J [x]" in Formula (8) is the minimization criterion of the Wiener filter to be used in the generation of the restoration filter. That is, the restoration filter generation unit 71 calculates the filter coefficient x of such a Wiener filter that the MTF value of the restoration RGB image data for each color meets 1.0 or less, based on the frequency characteristics ($MTF_K(\omega_x, \omega_y)$, $K \in \{R, G, B\}$) of the lens MTFs 47R, 47G, 47B and the function $d_K$ ($\chi$). Thereby, in the restoration filter generation unit 71, the restoration filter 66 is generated. Similarly to the first and second embodiments, the restoration filter 66 is stored in the memory 14 of the digital camera 2.

[Formula 8]

$$\text{minimize } J[x] \; s.t. \; \| d_K(f(\omega_x, \omega_y|x)) MTF_K(\omega_x, \omega_y) \| \le 1, \quad K \in \{R, G, B\} \tag{8}$$

[Formula 9]

$$J[x] = \iint ( \| 1 - f(\omega_x, \Omega_y|) MTF_J(\omega_x, \omega_y) \|^2 S_J(\omega_x, \omega_y) + \| f(\omega_x, \omega_y|x) \|^2 N_J(\omega_x, \omega_y) ) d\omega_x d\omega_y \tag{9}$$

<Action of Restoration Filter Generation Device According to Third Embodiment>

Figure 18:
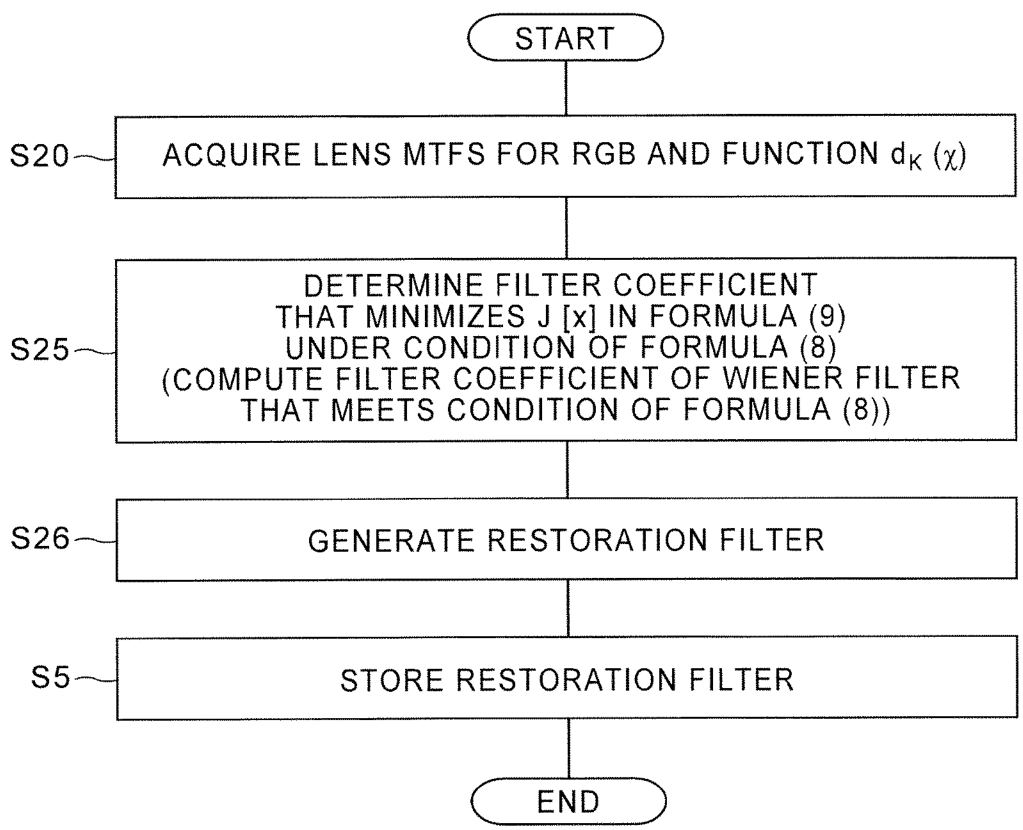
FIG. 18 is a flowchart showing the flow of the generation process of the restoration filter according to the third embodiment.

Next, the generation process of the restoration filter 66 by the restoration filter generation device 68 having the above configuration is explained using FIG. 18. When the restoration filter generation operation is performed in the operation unit 41, the device CPU 69 reads the restoration filter generation program 70 in the storage 43 to execute it, and thereby, functions as the MTF acquisition unit 50, the amplification factor acquisition unit 59 and the restoration filter generation unit 71. Here, the process of inputting the lens MTFs 47R, 47G, 47B and the function $d_K(\chi)$ respectively acquired by the MTF acquisition unit 50 and the amplification factor acquisition unit 59 to the restoration filter generation unit 71 is basically the same as the above second embodiment, and therefore, the explanation is omitted herein (step S20).

First, the restoration filter generation unit 71 determines the frequency characteristic MTF of the lens MTF in the luminance system, the signal power $S_Y$ and the noise power $N_Y$, based on the frequency characteristics $MTF_K$ of the lens MTFs 47R, 47G, 47B and the signal powers $S_K$ and noise powers $N_K$ for the respective colors of RGB, respectively.

Subsequently, the restoration filter generation unit 71, as shown in the above-described Formulas (8) and (9), calculates the filter coefficient x (the filter coefficient x of the Wiener filter) that minimizes the functional J [x] under the condition that the MTF value of the restoration RGB image data for each color meets 1.0 or less (step S25). Thereby, the restoration filter 66 is generated (step S26).

The restoration filter 66 generated by the restoration filter generation unit 71 is stored in the storage 43. Thereafter, similarly to the first embodiment, the restoration filter 66 is stored in the memory 14 (step S5).

<Action of Digital Camera According to Third Embodiment>

The imaging process in the digital camera 2 according to the third embodiment also is basically the same as the flow of the imaging process according to the first embodiment shown in FIG. 8, except that the point-image restoration process is performed using the restoration filter 66 instead of the restoration filter 12 according to the first embodiment, and therefore, the explanation is omitted herein.

Function Effect of Third Embodiment

Figure 19:
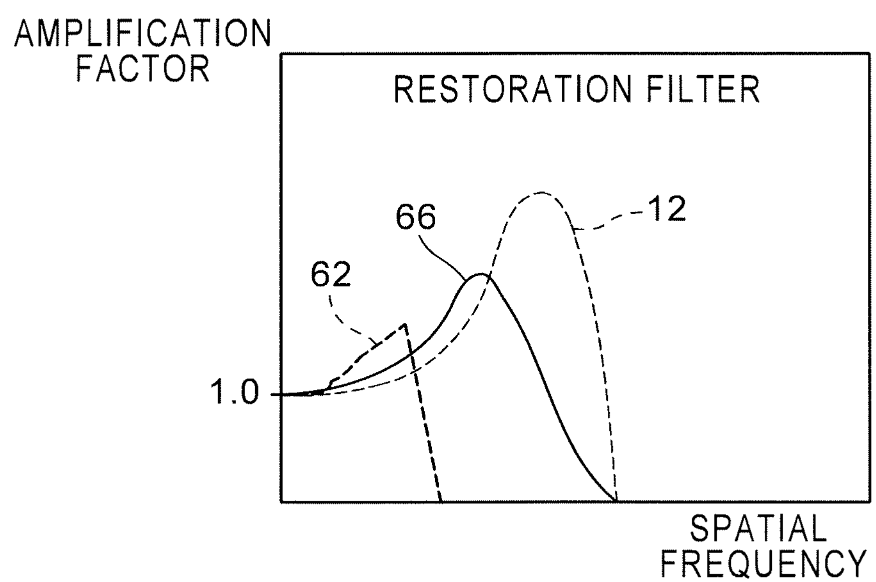
FIG. 19 is an explanatory diagram for explaining a function effect of the third embodiment.

As shown in FIG. 19, in the digital camera 2 according to the third embodiment, the point-image restoration process is performed using the restoration filter 66 generated by computing the filter coefficient x that minimizes the functional J [x] under the condition that the MTF value of the restoration RGB image data for each color meets 1.0 or less. Thereby, each MTF value of the restoration RGB image data is suppressed to 1.0 or less.

Further, by computing the filter coefficient x that minimizes the functional J [x] under the above condition, it is possible to directly generate the restoration filter 66 optimized such that both of the attenuation for the R and G signals and the amplification of the noise for the B signal are suppressed. In the second embodiment, in the case where the SN ratio for a particular color of RGB is low and the MTF value corresponding to the particular color is low, there is a fear that the restoration filter has a attenuation feature for suppressing the noise emphasis and this brings the occurrence of a phenomenon in which the frequencies for all colors are brought to attenuation features. However, the third embodiment can prevent this. That is, in the third embodiment, it is possible to averagely perform the best frequency restoration while tolerating the noise emphasis for the particular color in some degree, and to ensure that an excessive emphasis of the MTF value does not occur for any color.

Moreover, it is possible to prevent the overcorrection of the MTF value that is caused by the impossibility to achieve an ideal frequency characteristic due to the restriction of the tap number of the restoration filter.

Forth Embodiment

Next, a restoration filter generation device according to a fourth embodiment of the present invention is explained. In the above respective embodiments, each of the restoration filters 12, 62, 66 is generated based on the lens MTFs 47R, 47G, 47B. In contrast, in the restoration filter generation device according to the fourth embodiment, the generation of a restoration filter 73 (see FIG. 20 and FIG. 21) is performed based on the lens MTF 47G for a particular color (in the embodiment, the G color).

<Configuration of Restoration Filter Generation Device According to Fourth Embodiment>

Figure 20:
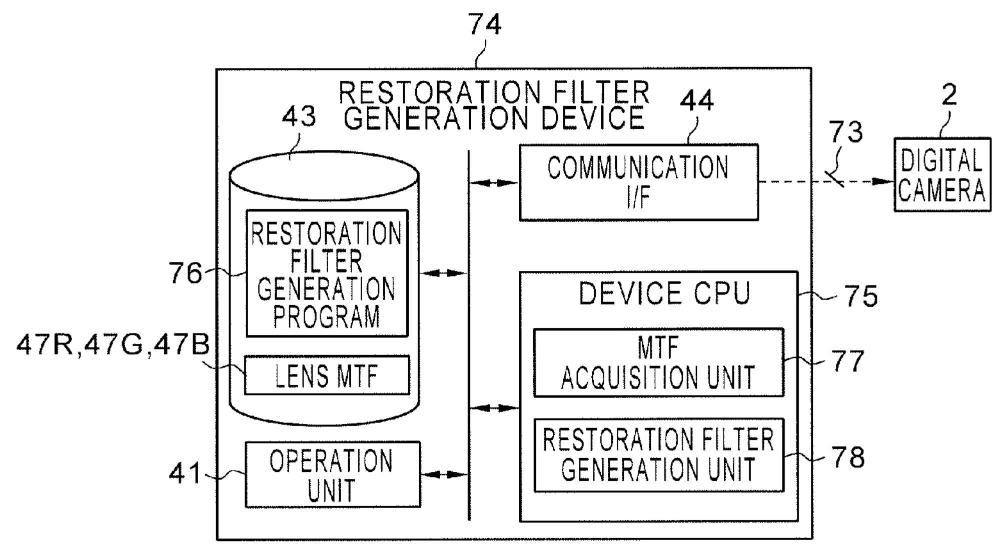
FIG. 20 is a block diagram showing the electric configuration of a restoration filter generation device according to a fourth embodiment.

As shown in FIG. 20, a restoration filter generation device 74 according to the fourth embodiment basically has the same configuration as the first embodiment, except that a device CPU 75 is included, and that a restoration filter generation program 76 (corresponding to a program according to the present invention) is stored in the storage 43. Therefore, for constituents having the same functions and configurations as the above first embodiment, the same reference characters and the same numerals are assigned, and the explanation is omitted.

When the restoration filter generation operation is performed in the operation unit 41, the device CPU 75 reads the restoration filter generation program 76 from the storage 43, to execute it. Thereby, the device CPU 75 functions as an MTF acquisition unit (MTF acquisition device) 77 and a restoration filter generation unit (restoration filter generation device) 78.

Figure 21:
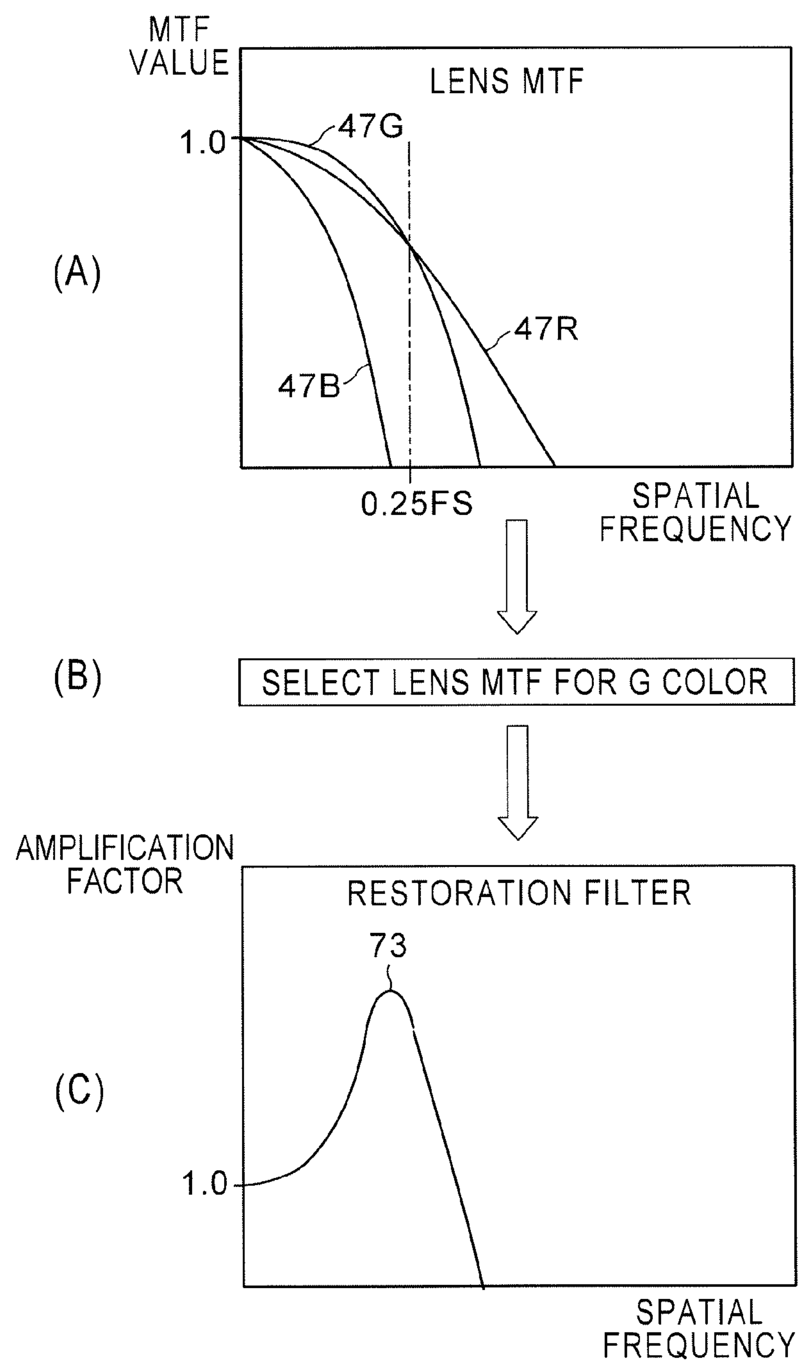
FIG. 21 is an explanatory diagram for explaining a restoration filter generation process according to the fourth embodiment.

As shown in the (A) portion and (B) portion in FIG. 21, the MTF acquisition unit 77 selects the lens MTF 47G for the G color, from the lens MTFs 47R, 47G, 47B for the respective colors of RGB stored in the storage 43, and outputs it to the restoration filter generation unit 78. Here, in the fourth embodiment, only the lens MTF 47G may be acquired from the MTF measurement device 49, and the lens MTF 47G may be stored in the storage 43.

As shown in the (C) portion of FIG. 21, the restoration filter generation unit 78 generates the restoration filter 73 that can suppress the overcorrection of the MTF value of the restoration RGB image data for each color, based on the lens MTF 47G. Here, generally, lenses are designed with the emphasis on G, which has, of RGB, the greatest influence on the visual characteristic. Therefore, at least in a frequency region that is equal to or less than the half of the Nyquist frequency of the color imaging element 23 (that is 0.25 Fs or less), the lens MTF 47G for the G plane is the highest of the lens MTFs 47R, 47G, 47B. Therefore, when the restoration filter is designed such that the lens MTF 47G for the G plane is corrected, the overcorrection of the MTF value of the restoration RGB image data is prevented, at least in a region that is equal to or less than 0.25 Fs (a particular spatial frequency according to the present invention).

The restoration filter generation unit 78 computes the frequency characteristic of a Wiener filter corresponding to the lens MTF 47G, based on the frequency characteristic ($MTF_G(\omega_x, \omega_y)$) of the lens MTF 47G. Subsequently, based on the frequency characteristic of the Wiener filter, the restoration filter generation unit 78 determines the filter coefficient of the restoration filter 73 that achieves the frequency characteristic in the luminance system. Here, as described in the first embodiment, as the method for designing, from the frequency characteristic, the restoration filter (filter coefficient) that achieves this, various known methods can be used. Thereby, in the restoration filter generation unit 78, the restoration filter 73 is generated. Similarly to the above respective embodiments, the restoration filter 73 is stored in the memory 14 of the digital camera 2.

<Action of Restoration Filter Generation Device According to Fourth Embodiment>

Figure 22:
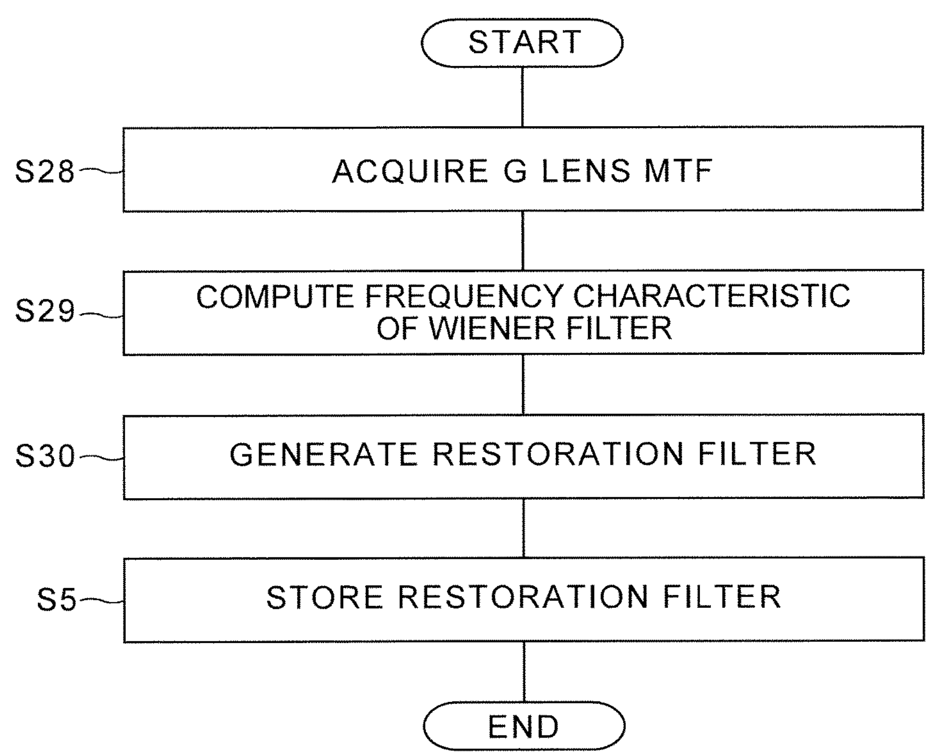
FIG. 22 is a flowchart showing the flow of the generation process of a restoration filter according to the fourth embodiment.

Next, the generation process of the restoration filter 73 by the restoration filter generation device 74 having the above configuration is explained using FIG. 22. When the restoration filter generation operation is performed in the operation unit 41, the device CPU 75 reads the restoration filter generation program 76 in the storage 43 to execute it, and thereby, functions as the MTF acquisition unit 77 and the restoration filter generation unit 78. Here, on this occasion, at least the lens MTF 47G is previously stored in the storage 43.

The MTF acquisition unit 77 acquires the lens MTF 47G from the storage 43, and outputs the lens MTF 47G to the restoration filter generation unit 78 (step S28, MTF acquisition step).

The restoration filter generation unit 78 computes the frequency characteristic of the Wiener filter corresponding to the lens MTF 47G, based on the frequency characteristic of the lens MTF 47G (step S29), and thereafter, determines the filter coefficient of the restoration filter 73 that achieves the frequency characteristic in the luminance system. Thereby, in the restoration filter generation unit 78, the restoration filter 73 is generated (step S30, restoration filter generation step).

The restoration filter 73 generated in the restoration filter generation unit 71 is stored in the storage 43. Thereafter, similarly to the first embodiment, the restoration filter 73 is stored in the memory 14 (step S5).

<Action of Digital Camera According to Fourth Embodiment>

The imaging process in the digital camera 2 according to the fourth embodiment also is basically the same as the flow of the imaging process in the first embodiment shown in FIG. 8, except that the point-image restoration process is performed using the restoration filter 73 instead of the restoration filter 12 according to the first embodiment, and therefore, the explanation is omitted herein.

Function Effect of Fourth Embodiment

According to the fourth embodiment, in the restoration filter generation device 74, the restoration filter 73 in the luminance system is generated based on the lens MTF 47G for the G color of the RGB, and in the digital camera 2, the point-image restoration process is performed using the restoration filter 73. At least in the frequency region that is equal to or less than the half of the Nyquist frequency (that is 0.25 Fs or less), the lens MTF 47G has the highest MTF value, of the lens MTFs 47R, 47G, 47B. Therefore, when the point-image restoration process is performed using the restoration filter 73 generated based on the lens MTF 47G, the overcorrection of the MTF value of the RGB signal component of the luminance system image data Y after the point-image restoration process is prevented at least in the frequency region of 0.25 Fs or less. That is, in the optical system 17, when the modulation transfer function MTF for the G color is higher than the modulation transfer functions MTF for the other colors at least in the frequency region of 0.25 Fs or less, the overcorrection of the MTF value of the image data for each color of the multiple colors corresponding to the luminance system image data after the restoration process is prevented at least in the frequency region of 0.25 Fs or less. Therefore, even when the restoration filter 73 is generated using the lens MTF 47G instead of the lens MTF with respect to the luminance, a certain degree of effect of suppressing the MTF value of the restoration RGB image data for each color corresponding to the luminance system image data Y after the point-image restoration process to 1.0 or less is expected at least in the frequency region of 0.25 Fs or less. Particularly, the greater the difference of the value of the lens MTF 47G for the G color from the values of the lens MTF 47R and lens MTF 47B for the R color and B color is, the more the effect is obtained.

Further, in the fourth embodiment, since the restoration filter 73 is generated based on the lens MTF 47G for the G color of RGB, it is possible to simplify the computation process required for the generation of the restoration filter (to simplify the design procedure of the restoration filter), compared to the above respective embodiments. Further, unlike the above respective embodiments, it is possible to perform the generation of the restoration filter 73 without acquiring the lens MTFs 47R, 47G, 47B for all colors of RGB.

Here, generally, lenses are designed such that the lens MTF 47G corresponding to the G color, which has the greatest influence on the visual characteristic, is highest at least in the frequency region of 0.25 Fs or less, and therefore, in the above fourth embodiment, the particular spatial frequency in the present invention is prescribed as 0.25 Fs or less. Therefore, in the case where the frequency region in which the lens MTF 47G corresponding to the G color is highest is increased or decreased from 0.25 Fs or less by the design of the lens, the particular spatial frequency in the present invention, in response to this, may be also increased or decreased.

Further, in the above fourth embodiment, the restoration filter 73 is generated based on the lens MTF 47G corresponding to the G color. However, in the case where the color filters of the color imaging element 23 include a color other than RGB, the restoration filter may be generated based on the lens MTF corresponding to the color that most contributes to the luminance, for example.

Other Application Examples

<Application Example to EDoF System>

The point-image restoration processes according to the above respective embodiments are image processes (restoration processes) of restoring the original subject image by recovering and correcting the image degradation (point-image blurring, point spread) depending on a particular image-taking condition (for example, the diaphragm value, the F-value, the focal distance, the lens type and the like), but the point-image restoration process to which the present invention can be applied is not limited to this. For example, the point-image restoration process according to the present invention can be applied also to the restoration process to the image data imaged by an imaging device that includes an optical system (an image-taking lens and the like) having an extended depth of field (focus) (EDoF). By performing the restoration process on the image data of a blurred image taken and acquired in a state in which the depth of field (depth of focus) is extended by the EDoF optical system, it is possible to restore and generate the image data that is in an in-focus state over a wide range and that gives a high resolution feeling. In this case, there is performed a restoration process using a restoration filter that is based on a point spread function (a PSF, an OTF (Optical Transfer Function), an MTF, a PTF (Phase Transfer Function), or the like) for the EDoF optical system and that has a filter coefficient set so as to allow for a suitable image restoration in the range of the extended depth of field (depth of focus).

In the following, an example of a system (EDoF system) relevant to the restoration of the image data taken and acquired through the EDoF optical system is explained. Here, in the example shown below, an example in which the restoration process is performed on the luminance system image data Y obtained from the image data (RGB image data) after the demosaic process is explained. However, the timing to perform the restoration process is not particularly limited, and the restoration process may be performed, for example, to the "image data before the demosaic process (mosaic image data)" or the "image data after the demosaic process and before the luminance signal conversion process (demosaic image data)."

Figure 23:
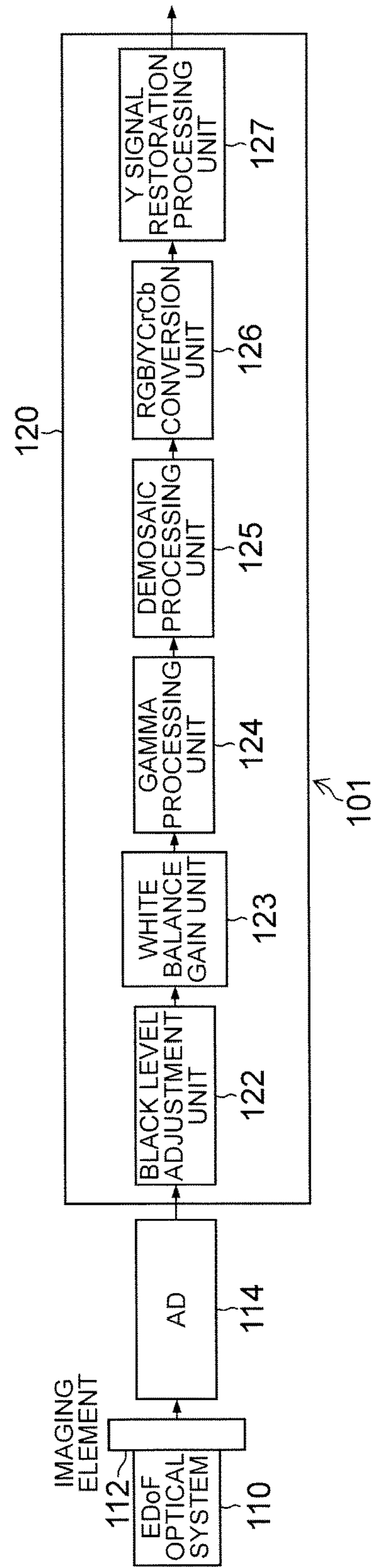
FIG. 23 is a block diagram showing the electric configuration of an imaging module including an EDoF optical system.

FIG. 23 is a block diagram showing a form of an imaging module 101 including an EDoF optical system. An imaging module (imaging device) 101 in the example includes an EDoF optical system (optical system) 110, a CCD type color imaging element 112 (a CMOS type may be adopted, imaging device), an AD conversion unit 114, and a restoration processing unit 120 that functions as a restoration processing device according to the present invention.

Figure 24:
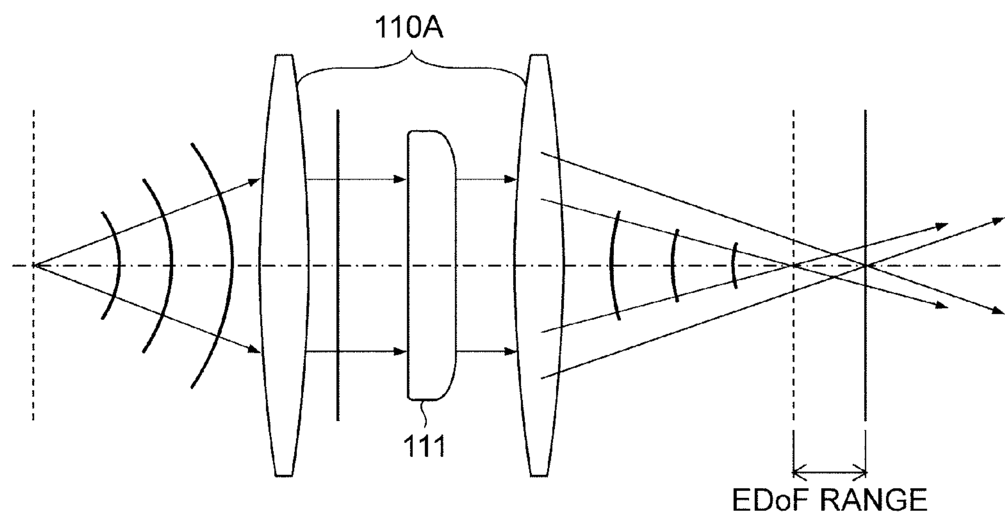
FIG. 24 is a schematic diagram of the EDoF optical system.

FIG. 24 is a diagram showing an example of the EDoF optical system 110. The EDoF optical system 110 includes fixed single-focus image-taking lenses 110A, and an optical filter 111 arranged at a pupil position. In order to obtain an extended depth of field (depth of focus) (EDoF), the optical filter 111, which modulates the phase, organizes (puts into an EDoF state) the EDoF optical system 110 (the image-taking lens 110A). Thus, the image-taking lens 110A and the optical filter 111 constitute a lens unit that modulates the phase and extends the depth of field.

Here, the EDoF optical system 110 includes other constituent elements as necessary, and for example, a diaphragm (not shown) is disposed at the vicinity of the optical filter 111. Further, the optical filter 111 may be a single filter, or may be a combination of multiple filters. Further, the optical filter 111 is just an example of an optical phase modulation device, and the EDoF state of the EDoF optical system 110 (the image-taking lens 110A) may be achieved by other devices. For example, instead of providing the optical filter 111, the EDoF state of the EDoF optical system 110 may be achieved by an image-taking lens 110A that is lens-designed so as to have a function equivalent to the optical filter 111 in the example. That is, the EDoF state of the EDoF optical system 110 can be achieved by a variety of devices for changing the wave-front of the image formation on the light receiving surface of the imaging element 112. For example, an "optical element whose thickness is changeable," an "optical element whose refractive index is changeable (a refractive-index distribution type wave-front modulation lens, or the like)," an "optical element whose thickness or refractive index is changeable by the coding on the lens surface, or the like (a wave-front modulation hybrid lens, an optical element to be formed on the lens surface as a phase plane, or the like)," and a "liquid crystal element capable of modulating the phase distribution of light (a liquid-crystal space-phase modulation element or the like)" can be employed as a device for putting the EDoF optical system 110 into the EDoF state. Thus, the present invention can be applied to not only the case where a regularly dispersed image can be formed by a light wave-front modulation element (the optical filter 111 (phase plate)), but also the case where the same dispersed image as the case of using the light wave-front modulation element can be formed by the image-taking lens 110A itself without using the light wave-front modulation element.

The EDoF optical system 110 according to the embodiment allows for downsizing, and can be suitably mounted in a camera-equipped mobile phone or a portable information terminal, because a focus adjustment mechanism to mechanically perform a focus adjustment can be omitted.

Returning to FIG. 23, an optical image after passing through the EDoF optical system 110 in an EDoF state is formed on the imaging surface of the color imaging element 112, and here, is converted into an electric signal.

The color imaging element 112 basically has the same configuration as the color imaging element 23 according to the above respective embodiments. The CCD type color imaging element 112 converts the subject light formed on the imaging surface by the EDoF optical system 110, into signal charges of a quantity corresponding to the incident light quantity, and outputs an analog RGB image signal.

The AD conversion unit 114 converts the analog RGB image signal output from the color imaging element 112, into digital mosaic image data for each color of RGB. The mosaic image data for each color is input to the restoration processing unit 120.

The restoration processing unit 120 includes, for example, a black level adjustment unit 122, a white balance gain unit 123, a gamma processing unit 124, a demosaic processing unit 125, an RGB/YCrCb conversion unit (hereinafter, abbreviated to a conversion unit, image data generation device) 126, and a Y signal restoration processing unit (restoration processing device) 127.

The black level adjustment unit 122 performs a black level adjustment on the mosaic image data for each color output from the AD conversion unit 114. As the black level adjustment, a known method can be employed. For example, in the case of focusing attention on an effective photoelectric conversion element, the black level adjustment is performed by determining the average of dark current amount acquisition signals respectively corresponding to multiple OB photoelectric conversion elements contained in a photoelectric conversion element line containing the effective photoelectric conversion element and subtracting the average from a dark current amount acquisition signal corresponding to the effective photoelectric conversion element.

The white balance gain unit 123 performs a gain adjustment corresponding to the white balance gain of the mosaic image data for each color after the black level data adjustment.

The gamma processing unit 124 performs a gamma correction for the gradation correction such as half tone such that the mosaic image data for each color after the white balance adjustment has an intended gamma characteristic.

The demosaic processing unit 125 performs a demosaic process on the mosaic image data for each color after the gamma correction, and outputs the RGB image data composed of the color data of the three planes of RGB.

The conversion unit 126, which is basically the same as the conversion unit 37 according to the above respective embodiments, performs the YC conversion process on the RGB image data output from the demosaic processing unit 125, and generates and outputs the luminance system image data Y and the color-difference system image data Cb, Cr.

The Y signal restoration processing unit 127 performs the restoration process on the luminance system image data Y from the conversion unit 126, based on a previously stored restoration filter. The restoration filter, for example, has a deconvolution kernel having a kernel size of 7×7 (corresponding to a tap number of M=7, N=7), and a computation coefficient (restoration gain data, corresponding to the filter coefficient) corresponding to the deconvolution kernel, and is used in a deconvolution process (deconvolution computation process) by the phase modulation amount of the optical filter 111. Here, the restoration filter corresponds to the optical filter 111, and is stored in a memory not illustrated. Further, the kernel size of the deconvolution kernel is not limited to the size of 7×7.

Figure 25:
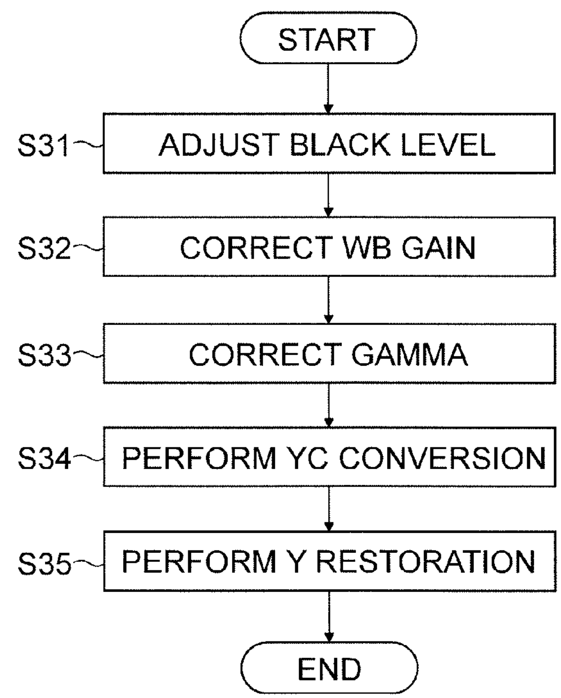
FIG. 25 is a flowchart showing the flow of a restoration process by a restoration processing unit that constitutes an imaging module.

Next, the restoration process by the restoration processing unit 120 is explained using the flowchart shown in FIG. 25.

The mosaic image data for each color is input from the AD conversion unit 114 to one input of the black level adjustment unit 122, and the black level data is input to another input. The black level adjustment unit 122 subtracts the black level data from the mosaic image data for each color, and outputs the mosaic image data for each color after the subtraction process, to the white balance gain unit 123 (step S31). Thereby, the mosaic image data for each color no longer includes the black level component.

To the mosaic image data for each color after the black level adjustment, the processes by the white balance gain unit 123 and the gamma processing unit 124 are sequentially performed (steps S32 and S33).

The mosaic image data for each color after the gamma correction is converted in the conversion unit 126 into the luminance system image data Y and the color-difference system image data Cb, Cr (step S34), after the demosaic process by the demosaic processing unit 125.

The Y signal restoration processing unit 127 performs, on the luminance system image data Y, the restoration process of applying the deconvolution process by the phase modulation amount of the optical filter 111 of the EDoF optical system 110 (step S35). That is, the Y signal restoration processing unit 127 performs the deconvolution process (deconvolution computation process) between a luminance signal corresponding to a predetermined unit pixel group around an arbitrary process-target pixel (herein, a luminance signal for 7×7 pixels) and a restoration filter (a deconvolution kernel of 7×7 and the computation coefficient) that is previously stored in the memory or the like. The Y signal restoration processing unit 127 performs the restoration process of removing the image blurs of the whole image by repeating the deconvolution process for each of the predetermined unit pixel groups so as to cover the whole region of the imaging surface. The restoration filter is defined depending on the center position of the pixel group for which the deconvolution process is performed. That is, a common restoration filter is applied to adjacent pixel groups. For further simplifying the restoration process, it is preferable to apply a common restoration filter to all pixel groups.

The point-image (optical image) of the luminance signal after passing through the EDoF optical system 110 is formed on the color imaging element 112, as a large point-image (a blurred image) (see the (A) portion of FIG. 5), and but is restored to a small point-image (an image giving a high resolution feeling) by the deconvolution process in the Y signal restoration processing unit 127 (see the (B) portion of FIG. 5).

As described above, the restoration process is applied to the luminance system image data Y after the demosaic process, and therefore, it is unnecessary to have a parameter of the restoration process for each of RGB, allowing for the speeding up of the restoration process. Further, the deconvolution process is performed by arranging the individual luminance signals of adjacent pixels as the predetermined unit and applying a common restoration filter to the unit, instead of performing the deconvolution process by arranging, as one unit, each of the individual R, G and B image signals corresponding to R, G and B pixels that are positioned at intervals. Therefore, the accuracy of the restoration process is enhanced. Here, as for the color-difference system image data Cb, Cr, even when the resolution feeling is not increased by the restoration process, the image quality is allowed because of the characteristic of the visual sensation of human eyes. Further, in the case where the image is recorded in a compression format such as JPEG (Joint Photographic Experts Group), the color-difference system image data Cb, Cr are compressed at a higher compressibility than that of the luminance system image data Y, and therefore, it is less necessary to increase the resolution by the restoration process. Thus, it is possible to attain both the enhancement of the restoration accuracy and the simplification and speeding up of the process.

The restoration processes according to the respective embodiments of the present invention can be applied also to the restoration process of the EDoF system as explained above. In this case, based on the MTF for the EDoF optical system, the restoration filter generation devices according to the above respective embodiments generate a restoration filter having a filter coefficient that is set so as to allow for a suitable image restoration in the range of the extended depth of field (depth of focus).

<Application Example to Smart Phone>

In the above respective embodiments, the digital camera 2 has been explained as an example of the image processing device and the imaging device according to the present invention. However, the present invention can be applied also to a mobile phone, a smart phone, a PDA (Personal Digital Assistants), a tablet terminal and a portable game machine that have an image-taking function, for example. In the following, as an example, a smart phone is explained in detail with reference to the drawings.

Figure 26:
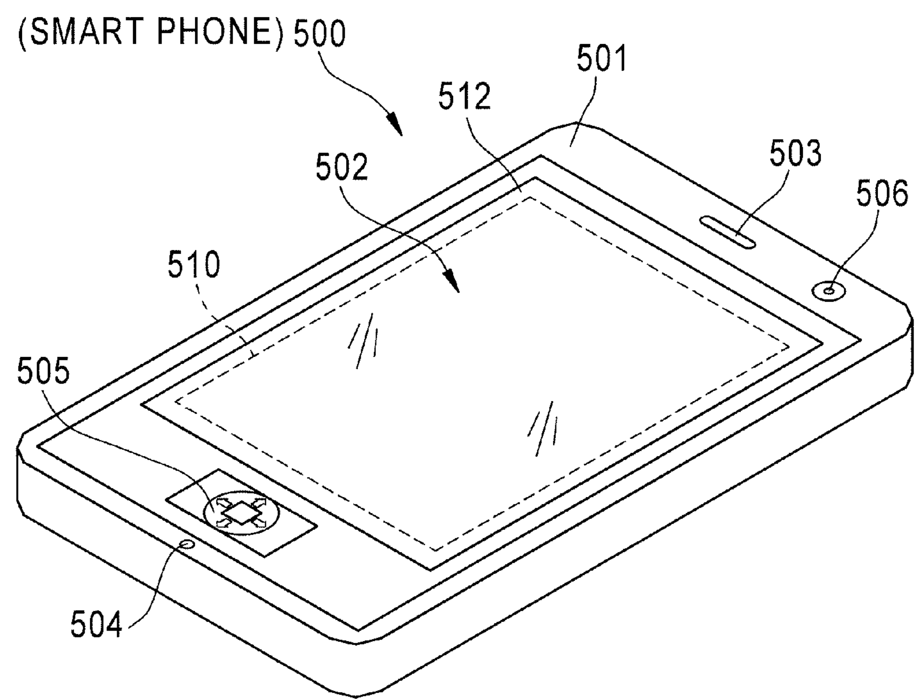
FIG. 26 is a perspective view of a smart phone.

FIG. 26 shows an external view of a smart phone 500. The smart phone 500 has a case 501 in a flat plate shape. It includes, on one surface of the case 501, a display/input unit 502, a speaker 503, a microphone 504, an operation unit 505 and a camera unit 506. Here, the configuration of the case 501 is not limited to this, and for example, a configuration in which the display unit and the input unit are separated, or a configuration having a folding structure or a sliding mechanism can be also employed. Further, the camera unit 506 is provided also on the other surface of the case 501.

The display/input unit 502 displays an image (a still image and a moving image), character information and the like. Further, the display/input unit 502 has a so-called touch panel structure in which a user operation to the displayed information is detected. The display/input unit 502 is composed of a display panel 510 and an operation panel 512.

The display panel 510 is an LCD (Liquid Crystal Display), an OELD (Organic Electro-Luminescence Display) or the like that is used as a display device. The operation panel 512, which has optical transparency, is placed on the display surface of the display panel 510. The operation panel 512 is a device to detect a single or multiple coordinates that are operated by a finger of a user or a stylus. When this device is operated by a finger of a user or a stylus, a detection signal generated due to the operation is output to a CPU of the smart phone 500. The CPU detects the operation position (coordinate) on the display panel 510, based on the received detection signal. As the position detection scheme to be employed in such an operation panel 512, there are a matrix switch scheme, a resistive film scheme, a surface acoustic wave scheme, an infrared ray scheme, an electromagnetic induction scheme, an electrostatic capacity scheme and the like.

Figure 27:
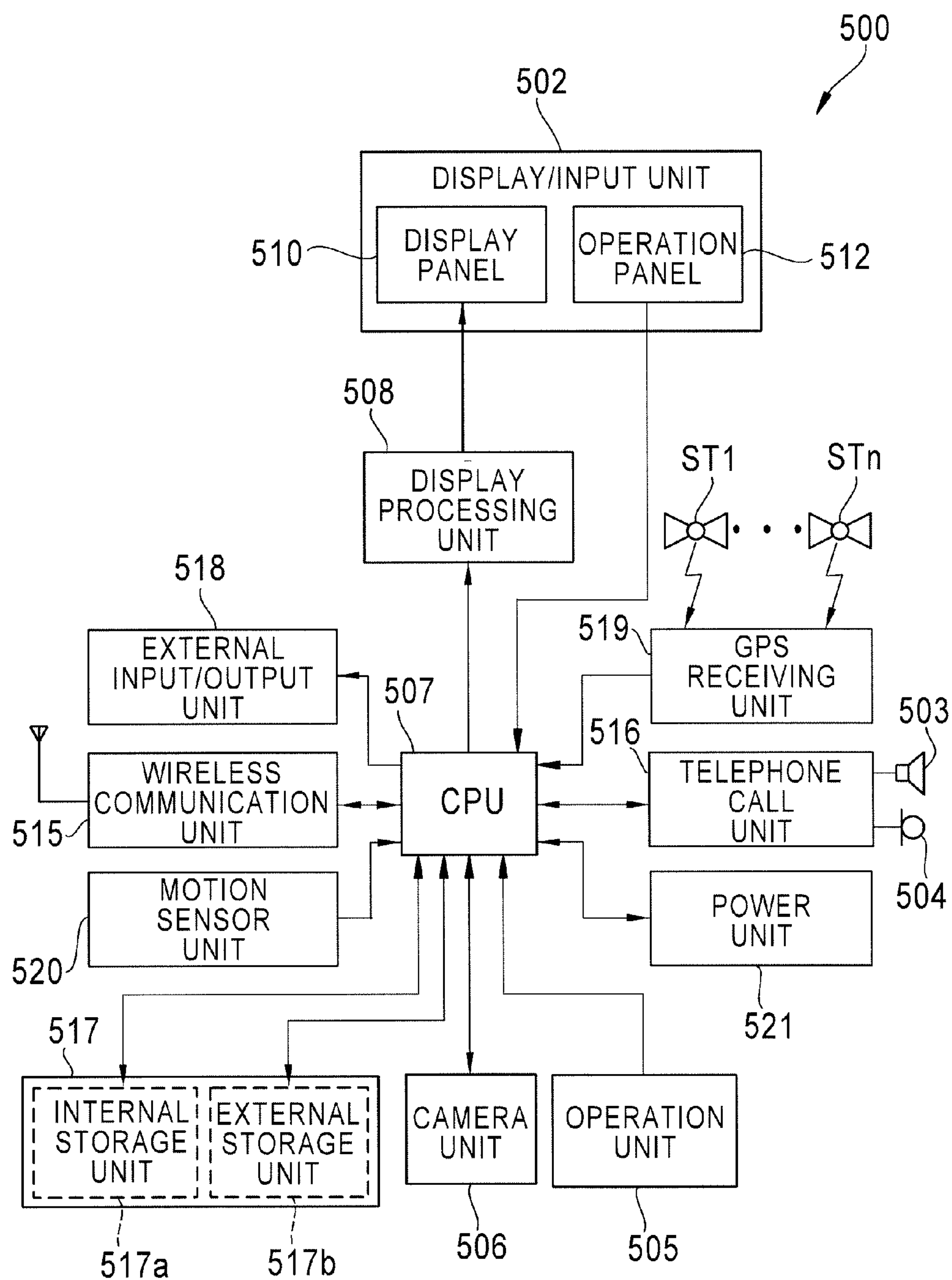
FIG. 27 is a block diagram showing the electric configuration of the smart phone.

As shown in FIG. 27, the smart phone 500 includes a wireless communication unit 515, a telephone call unit 516, a storage unit 517, an external input/output unit 518, a GPS (Global Positioning System) receiving unit 519, a motion sensor unit 520 and a power unit 521, in addition to the display/input unit 502, the speaker 503, the microphone 504, the operation unit 505, the camera unit 506, the CPU 507 and a display processing unit 508.

The operation unit 505 is a hardware key in which a push-button switch, a cross key or the like is used for example, and receives an instruction from a user. The operation unit 505 is mounted on a lower part of the display unit of the case 501 or a side surface of the case 501, for example.

The camera unit 506 basically has the same configuration as the digital camera 2 according to the above respective embodiments. In the memory 14 of the camera unit 506, any one of the restoration filters 12, 62, 66, 73 according to the above respective embodiments is stored.

The display processing unit 508 displays an image or character information on the display/input unit 502, in accordance with an instruction of the CPU 507.

The wireless communication unit 515 performs the wireless communication with a base station device contained in a mobile communication network, in accordance with an instruction of the CPU 507. Using the wireless communication, the sending and receiving of a variety of file data such as audio data and image data, e-mail data or the like, and the receiving of Web data, streaming data or the like are performed.

The telephone call unit 516 includes the speaker 503 and the microphone 504. The telephone call unit 516 converts a user voice input through the microphone 504 into audio data, to output it to the CPU 507, and decodes the audio data received by the wireless communication unit 515 or the like, to output it from the speaker 503.

The storage unit 517 stores the control program and control data of the CPU 507, application software, address data associated with the name, telephone number and others of a communication partner, sent or received e-mail data, and the like, and temporarily stores streaming data and the like. Further, the storage unit 517 is composed of an internal storage unit 517*a* built in the smart phone and an external storage unit 517*b* having a detachable external memory slot. Here, as the internal storage unit 517*a* and the external storage unit 517*b*, various known storage media such as a flash memory type and a hard disc type are used.

The external input/output unit 518 serves as an interface with all external apparatuses that are linked with the smart phone 500, and is directly or indirectly connected with other external apparatuses, through communication or the like.

The GPS receiving unit 519 receives GPS signals sent from GPS satellites ST1 to STn, executes a positioning computation process based on the multiple GPS signals received, and detects the position of the smart phone 500 as the latitude, the longitude and the altitude. The detection result is output to the CPU 507.

The motion sensor unit 520 includes, for example, a three-axis acceleration sensor and the like, and detects the physical motion of the smart phone 500. Thereby, the moving direction and acceleration of the smart phone 500 are detected. The detection result is output to the CPU 507. Further, the power unit 521 supplies the electric power stored in a battery not illustrated, to each unit of the smart phone 500.

The CPU 507 operates in accordance with the control program and control data read from the storage unit 517, and integrally controls each unit of the smart phone 500. Further, the CPU 507 executes the display control to the display panel 510, the operation detection control for detecting a user operation through the operation unit 505 or the operation panel 512 and the like.

By the execution of the display control, the CPU 507 displays, software keys such as an icon for activating application software and a scroll bar, or displays a window for creating an e-mail message, or the like on the display panel 510. Here, the scroll bar means a software key for receiving an instruction to move the display portion of an image that is too large to fit inside the display region of the display panel 510, or the like.

Further, by the execution of the operation detection control, the CPU 507 detects a user operation through the operation unit 505, receives an operation to the above icon and an input of a character string to an input box of the above window, through the operation panel 512, or receives a scroll request of a display image through the scroll bar.

Moreover, by the execution of the operation detection control, the CPU 507 has a touch panel control function to decide whether the operation position to the operation panel 512 is a superimposition portion (display region) that overlaps with the display panel 510, or an outer edge portion (non-display region) that is other than this and that does not overlap with the display panel 510, and to control the sensitive region of the operation panel 512 and the display positions of the software keys.

Further, the CPU 507 can detect a gesture operation to the operation panel 512, and can execute a previously set function in response to the detected gesture operation. The gesture operation means not a conventional simple touch operation, but an operation to draw a track from at least one of multiple positions by drawing the track by a finger or the like, by designating multiple positions simultaneously, or by combining them.

As described above, the camera unit 506 of the smart phone 500 having the above configuration basically has the same configuration as the digital camera 2 according to the above respective embodiments, and therefore, the same effects as the above respective embodiments are obtained.

{Addition}

In the above respective embodiments, the imaging devices having an image-taking function, as exemplified by the digital camera 2 and the smart phone 500, have been explained as examples of the image processing device to perform the restoration process according to the present invention, but the image-taking function is not essential. For example, the present invention can be applied also to various image processing devices to perform the restoration process on the image data acquired through the internet or a recording medium, as exemplified by a tablet terminal, a smart phone and a PC.

The present invention can be provided, for example, as a computer-readable program code for making an imaging device or an electronic apparatus including an imaging device perform the above process, a non-transitory and computer-readable recording medium in which the program code is stored (for example, an optical disc (for example, a CD (Compact Disc), a DVD (Digital Versatile Disc) and a BD (Blu-ray® Disc)), a magnetic disc (for example, a hard disc and a magneto-optical disc), and a USB (Universal Serial Bus) memory), and a computer program product in which an executable code for the method is stored.

In the above respective embodiments, the digital camera 2, the smart phone 500 and the like corresponding to the image processing device and the imaging device according to the present invention store the restoration filters that are separately generated in the restoration filter generation devices according to the above respective embodiments. However, the digital camera 2 or the like, and the restoration filter generation device may be unified.

What is claimed is:

1. A restoration filter generation device which generates a restoration filter for performing a restoration process on luminance system image data, the restoration process being based on a point-image distribution in an optical system, the luminance system image data being image data relevant to luminance and being generated based on image data for each color of multiple colors, the image data for each color of the multiple colors being obtained by an imaging device including the optical system, the restoration filter generation device comprising:

a modulation transfer function MTF acquisition device which acquires a modulation transfer function MTF for the optical system; and a restoration filter generation unit which generates the restoration filter based on the modulation transfer function MTF acquired by the MTF acquisition device, the restoration filter suppressing an MTF value of image data for each color of the multiple colors to 1.0 or less at least in a region of a particular spatial frequency or less, the image data for each color of the multiple colors corresponding to the luminance system image data after the restoration process, wherein:

the image data for the multiple colors contains image data for each color of RGB;

the restoration filter generation unit comprises an amplification factor acquisition device which acquires an amplification factor of the MTF value for each spatial frequency with respect to image data for each color of the multiple colors, the amplification factor corresponding to an amplification factor of the MTF value for each spatial frequency with respect to the luminance system image data after the restoration process, the image data for each color of the multiple colors being generated by an inverse conversion process of the luminance system image data;

the MTF acquisition device acquires the modulation transfer function MTF for only the G color; and the restoration filter generation unit determines a frequency characteristic of a Wiener filter based on the modulation transfer function MTF for only the G color and the acquisition result by the amplification factor acquisition device, and generates the restoration filter that achieves the frequency characteristic in a luminance system.

2. The restoration filter generation device according to claim 1, wherein the particular spatial frequency is equal to or less than a half of a Nyquist frequency of an imaging element included in the imaging device.

3. The restoration filter generation device according to claim 1, wherein the MTF acquisition device acquires the modulation transfer function MTF for the optical system including a lens unit that modulates a phase and extends a depth of field.

4. An image processing device comprising:

an image data generation device which generates luminance system image data based on image data for each color of multiple colors, the luminance system image data being image data relevant to luminance, the image data for each color of the multiple colors being obtained by an imaging device including an optical system;

a restoration filter storage device which stores the restoration filter generated by the restoration filter generation device according to claim 1; and a restoration processing device which performs a restoration process on the luminance system image data generated by the image data generation device, using the restoration filter stored in the restoration filter storage device.

5. An imaging system comprising:

an imaging device which outputs image data for each color of multiple colors, the imaging device including an optical system; and the image processing device according to claim 4.

6. A restoration filter generation method for generating a restoration filter for performing a restoration process on luminance system image data, the restoration process being based on a point-image distribution in an optical system, the luminance system image data being image data relevant to luminance and being generated based on image data for each color of multiple colors, the image data for each color of the multiple colors being obtained by an imaging device including the optical system, the restoration filter generation method comprising:

a modulation transfer function MTF acquisition step of acquiring a modulation transfer function MTF for the optical system; and a restoration filter generation step of generating the restoration filter based on the modulation transfer function MTF acquired in the MTF acquisition step, the restoration filter suppressing an MTF value of image data for each color of the multiple colors to 1.0 or less at least in a region of a particular spatial frequency or less, the image data for each color of the multiple colors corresponding to the luminance system image data after the restoration process, wherein:

the image data for the multiple colors contains image data for each color of RGB;

the restoration filter generation step comprises an amplification factor acquisition step of acquiring an amplification factor of the MTF value for each spatial frequency with respect to image data for each color of the multiple colors, the amplification factor corresponding to an amplification factor of the MTF value for each spatial frequency with respect to the luminance system image data after the restoration process, the image data for each color of the multiple colors being generated by an inverse conversion process of the luminance system image data;

the MTF acquisition step acquires the modulation transfer function MTF for only the G color; and the restoration filter generation step determines a frequency characteristic of a Wiener filter based on the modulation transfer function MTF for only the G color and the acquisition result by the amplification factor acquisition step, and generates the restoration filter that achieves the frequency characteristic in a luminance system.

7. An image processing method comprising:

an image data generation step of generating luminance system image data based on image data for each color of multiple colors, the luminance system image data being image data relevant to luminance, the image data for each color of the multiple colors being obtained by an imaging device including an optical system; and a restoration processing step of performing a restoration process on the luminance system image data generated in the image data generation step, using the restoration filter generated by the restoration filter generation method according to claim 6.

8. A non-transitory computer-readable medium recording a program for generating a restoration filter for performing a restoration process on luminance system image data, the restoration process being based on a point-image distribution in an optical system, the luminance system image data being image data relevant to luminance and being generated based on image data for each color of multiple colors, the image data for each color of the multiple colors being obtained by an imaging device including the optical system, the program causing a computer to execute:

a modulation transfer function MTF acquisition step of acquiring a modulation transfer function MTF for the optical system; and a restoration filter generation step of generating the restoration filter based on the modulation transfer function MTF acquired in the MTF acquisition step, the restoration filter suppressing an MTF value of image data for each color of the multiple colors to 1.0 or less at least in a region of a particular spatial frequency or less, the image data for each color of the multiple colors corresponding to the luminance system image data after the restoration process, wherein:

the image data for the multiple colors contains image data for each color of RGB;

the restoration filter generation step comprises an amplification factor acquisition step of acquiring an amplification factor of the MTF value for each spatial frequency with respect to image data for each color of the multiple colors, the amplification factor corresponding to an amplification factor of the MTF value for each spatial frequency with respect to the luminance system image data after the restoration process, the image data for each color of the multiple colors being generated by an inverse conversion process of the luminance system image data;

the MTF acquisition step acquires the modulation transfer function MTF for only the G color; and the restoration filter generation step determines a frequency characteristic of a Wiener filter based on the modulation transfer function MTF for only the G color and the acquisition result by the amplification factor acquisition step, and generates the restoration filter that achieves the frequency characteristic in a luminance system.

* * * * *